(12) United States Patent
Axson et al.

(10) Patent No.: US 11,647,281 B2
(45) Date of Patent: May 9, 2023

(54) SURVEILLANCE AND MONITORING SYSTEM

(71) Applicant: Minuteman Security Technologies, Inc, Andover, MA (US)

(72) Inventors: Jay Axson, Tewksbury, MA (US); John Julien, Jr., Nashua, NH (US)

(73) Assignee: Minuteman Security Technologies, Inc, Andover, MA (US)

( * ) Notice: Subject to any disclaimer, the term of this patent is extended or adjusted under 35 U.S.C. 154(b) by 0 days.

(21) Appl. No.: 17/338,559

(22) Filed: Jun. 3, 2021

(65) Prior Publication Data
US 2021/0297592 A1    Sep. 23, 2021

Related U.S. Application Data

(63) Continuation of application No. 15/439,543, filed on Feb. 22, 2017, now Pat. No. 11,032,473.
(Continued)

(51) Int. Cl.
*H04N 5/232* (2006.01)
*B60R 25/30* (2013.01)
(Continued)

(52) U.S. Cl.
CPC ....... *H04N 5/23241* (2013.01); *B60R 25/305* (2013.01); *G08B 13/19602* (2013.01);
(Continued)

(58) Field of Classification Search
CPC ........... H04N 5/23241; H04N 5/23206; H04N 7/181; H04N 21/2743; H04N 21/4524;
(Continued)

(56) References Cited

U.S. PATENT DOCUMENTS 6,606,562 B1  8/2003 Gifford
7,027,808 B2  4/2006 Wesby
(Continued)

OTHER PUBLICATIONS

Seon a Safe Fleet Brand, Bus Video Software, vMax® Commander Video Surveillance Management, http://www.seon.com/products/video-management-software/vmax-commander, Copyright © Seon 2017.
(Continued)

*Primary Examiner* — Mishawn N. Hunter
(74) *Attorney, Agent, or Firm* — Morse, Barnes-Brown & Pendleton, P.C.; Sean D. Detweiler, Esq.

(57) ABSTRACT

A method and system provides centralized redundant monitoring suitable for effectively recording and tracking video monitoring systems at a plurality of remote surveillance locations. The method and system are configured to track, monitor, capture, and record video originating from transportation vehicles using a novel technological configuration that minimizes overall and sub-system downtime relative to conventional technologies. The remote surveillance locations are capable of utilizing self-healing and recovery mechanisms and reporting status information to the centralized monitoring system. The centralized monitoring system can use information received from the remote surveillance locations to remotely monitor the status of the remote surveillance systems, to initiate remotely self-healing and recovery mechanisms, and request previously recorded surveillance data and live surveillance data in real time.

21 Claims, 7 Drawing Sheets

Related U.S. Application Data

(60) Provisional application No. 62/302,416, filed on Mar. 2, 2016.

(51) Int. Cl.
  *H04N 21/2743* (2011.01)
  *H04N 21/45* (2011.01)
  *H04N 7/18* (2006.01)
  *G08B 13/196* (2006.01)
  *G08B 25/08* (2006.01)
  *G01S 19/14* (2010.01)
  *H04N 21/414* (2011.01)

(52) U.S. Cl.
  CPC . *G08B 13/19641* (2013.01); *G08B 13/19654* (2013.01); *G08B 13/19665* (2013.01); *G08B 13/19669* (2013.01); *G08B 13/19689* (2013.01); *G08B 25/08* (2013.01); *H04N 5/23206* (2013.01); *H04N 7/181* (2013.01); *H04N 21/2743* (2013.01); *H04N 21/4524* (2013.01); *G01S 19/14* (2013.01); *H04N 21/41422* (2013.01)

(58) Field of Classification Search
  CPC ........ G08B 13/19602; G08B 13/19641; G08B 13/19654; G08B 13/19665; G08B 13/19669; G08B 13/19689; G08B 25/08; B60T 25/305
  See application file for complete search history.

(56) References Cited

U.S. PATENT DOCUMENTS

| | | |
|---|---|---|
| 7,173,526 B1 | 2/2007 | Monroe |
| 7,768,548 B2 | 8/2010 | Silvernail et al. |
| 8,140,358 B1 | 3/2012 | Ling et al. |
| 9,305,407 B1 | 4/2016 | Walton et al. |
| 9,466,197 B2 | 10/2016 | Hildick-Pytte |
| 9,625,720 B2 | 4/2017 | Nohara |
| 10,812,710 B2 | 10/2020 | Axson et al. |
| 11,032,473 B2 | 6/2021 | Axson et al. |
| 2001/0002815 A1 | 6/2001 | Seto |
| 2001/0034577 A1 | 10/2001 | Grounds et al. |
| 2004/0075539 A1 | 4/2004 | Savoie et al. |
| 2006/0126738 A1 | 6/2006 | Boice et al. |
| 2006/0129691 A1 | 6/2006 | Coffee et al. |
| 2008/0040268 A1 | 2/2008 | Corn |
| 2010/0087981 A1 | 4/2010 | Orozco-Perez |
| 2010/0245583 A1 | 9/2010 | Harel |
| 2010/0253482 A1 | 10/2010 | Catala Mora et al. |
| 2011/0021234 A1 | 1/2011 | Tibbitts et al. |
| 2011/0302214 A1 | 12/2011 | Frye et al. |
| 2011/0313593 A1 | 12/2011 | Cohen et al. |
| 2012/0105634 A1 | 5/2012 | Meidan et al. |
| 2012/0303256 A1 | 11/2012 | Morgan et al. |
| 2013/0155231 A1 | 6/2013 | Ohayon et al. |
| 2014/0114866 A1 | 4/2014 | Abhyanker |
| 2014/0274152 A1 | 9/2014 | Lichti |
| 2014/0344728 A1 | 11/2014 | Tuukkanen |
| 2015/0234636 A1 | 8/2015 | Barnes, Jr. |
| 2015/0365632 A1 | 12/2015 | Eilertsen |
| 2016/0021344 A1 | 1/2016 | Renkis |
| 2016/0021535 A1 | 1/2016 | Tali et al. |
| 2016/0203651 A1 | 7/2016 | Heath et al. |
| 2016/0337441 A1 | 11/2016 | Bloomquist et al. |
| 2017/0070859 A1 | 3/2017 | Agarwal et al. |
| 2017/0257602 A1 | 9/2017 | Axson et al. |
| 2018/0032997 A1 | 2/2018 | Gordon et al. |

OTHER PUBLICATIONS

Seon a Safe Fleet Brand, Bus Surveillance Systems & Fleet Management, http://www.seon.com/, Copyright © Seon 2017.
Final Office Action from U.S. Appl. No. 15/439,543, dated Jul. 29, 2019.
Non-Final Office Action from U.S. Appl. No. 15/439,543, dated Jan. 10, 2020.
Office Action from U.S. Appl. No. 15/439,543, dated Feb. 12, 2019.
Notice of Allowance for U.S. Appl. No. 16/250,630, dated Jul. 1, 2020.
Notice of Allowance for U.S. Appl. No. 15/439,543, dated Feb. 16, 2021.
Non-Final Office Action from U.S. Appl. No. 15/439,543, dated Jun. 26, 2020.
Final Office Action from U.S. Appl. No. 15/439,543, dated Jan. 16, 2021.

SURVEILLANCE AND MONITORING SYSTEM

CROSS-REFERENCE TO RELATED APPLICATION(S)

This application is a continuation of, and claims priority to and the benefit of, U.S. application Ser. No. 15/439,543, filed Feb. 22, 2017, which claimed priority to and the benefit of, Provisional Application No. 62/302,416, filed Mar. 2, 2016, for all subject matter contained in said applications. The disclosures of said applications are hereby incorporated by reference in their entirety.

FIELD OF THE INVENTION

Redundant monitoring systems suitable for effectively recording and tracking video monitoring systems at remote locations are provided. In particular, the monitoring systems track, monitor, capture, and record video originating from transportation vehicles using a novel technological configuration that minimizes overall and sub-system downtime relative to conventional technologies.

BACKGROUND

Generally, conventional surveillance systems are closed loop systems that require downloading of any captured video when the system is returned to a home station. For example, a video surveillance system on a public transportation bus may be configured to capture video on and/or around the bus and the captured video can be collected once the bus has returned to the service depot. Public transportation vehicles (such as a bus or train) are typically equipped with some combination of conventional surveillance and monitoring systems, including audio and video capturing devices, Computer Aided Dispatch/Automatic Vehicle Location (CAD/AVL) systems, and other safety monitoring systems (e.g., monitoring bus driver speed/activity). However, these surveillance and monitoring systems and technologies experience some shortcomings. One such example is that closed looped surveillance systems are not configured to be monitored remotely. As a result, in the event that a video capturing device is down, the managing system or party is generally not aware that the video system is not operating as desired until the captured video (or lack of captured video) is removed or attempted to be removed (e.g., downloaded) from the closed loop device(s) upon the vehicle's return to a central hub or dispatch. When a determination is made that video is not capturing properly and/or the captured data is corrupt or lost, the effected vehicle or device must be taken out of the active rotation (e.g., for service) until the problem is identified and resolved. In the public transportation industry, or in other industries (such as rental cars or other monitored fleet vehicles), taking a vehicle or device out of an active rotation because the surveillance or monitoring system is not functioning properly can cause significant issues for the transit service provider (e.g., delays, decreased volume of vehicles, etc.). In another example, if a closed loop device is away from the central hub, the captured video is not accessed until the device(s) are returned to the central hub, thus causing scenarios where lengthy time periods may occur with no video captured (e.g., because a recording device ran out of space) and/or before a video can be reviewed.

SUMMARY

There is a need for an improved reliable, redundant, self-recovery, surveillance and monitoring system technology that reduces instances of lost data or information, and optimizes time in service (correspondingly minimizing down time). The present invention is directed toward further solutions to address this need, in addition to having other desirable characteristics. Specifically, the present invention relates to a remote surveillance system capable of self-healing with recovery mechanisms and status reporting to a centralized storage system. The centralized storage system can monitor the status of the remote surveillance system, remotely repair the remote surveillance system, and request previously recorded surveillance data and live surveillance data in real time without requiring the vehicle to return to a particular location (such as a central hub or depot) to recover or download the recorded surveillance data.

In accordance with an example embodiment of the present invention, a vehicle remote surveillance system is provided. The vehicle remote surveillance system includes a plurality of components configured for mounting and operation in a vehicle. The plurality of components include a video recorder implemented on a video recording device with a processor, a computing device having a processor, the computing device communicatively coupled with the video recorder, and a centralized surveillance system configured distal from the plurality of components. The centralized surveillance system is communicatively coupled with at least one of the plurality of components configured for mounting in the vehicle. The centralized surveillance system also compares data confirming whether a separate system that is not part of the plurality of components is operating in real-time on the vehicle with data confirming whether the vehicle remote surveillance system is operating in real-time on the vehicle.

In some implementations the computing device includes a plurality of inputs and outputs. The video recording device further includes at least one data storage mechanism. In some implementations, the plurality of components further include at least one accelerometer configured for operation in a vehicle. In some implementations, the separate system that is not part of the plurality of components includes a Computer Aided Dispatch/Automatic Vehicle Location (CAD/AVL) system. In some implementations, the at least one video capturing device is configured to stream video data to the video recorder. In some implementations, a power controller configured to manage power to at least one of the plurality of components in the vehicle remote surveillance system.

In some implementations, the plurality of components are configured for mounting and operation including the plurality of components being repeatedly operable in temperature ranges between −40° C. and 75° C. In some implementations, the plurality of components further include a geolocation device. In some implementations, the centralized surveillance system receives status information for the vehicle from at least one of the plurality of components. In some implementations, the centralized surveillance system accesses available data associated with the vehicle from the vehicle remote surveillance system and derived from the separate system that is not part of the plurality of components. In some implementations, the centralized surveillance system verifies a real-time operating status of the vehicle based on a comparison of status information from the vehicle remote surveillance system for the vehicle and available data associated with the vehicle from a remote system and derived from the separate system that is not part of the plurality of components.

In some implementations, when one of the plurality of components is triggered to send out an alert notification, the centralized surveillance system receives the alert notification and records the alert notification. In some implementations, when the centralized surveillance system records more than a threshold number of alert notifications occurring within a predetermine period of time for one or more of the plurality of components, the centralized surveillance system outputs a service alert notification.

In accordance with an embodiment of the present invention, a vehicle surveillance system is provided. The vehicle monitoring system includes a self-healing and recovery mechanisms component and a plurality of components configured for mounting and operation in a vehicle. The plurality of components include at least one monitoring or sensing device, a computing device having a processor, the computing device communicatively coupled with the at least one monitoring or sensing device, and a centralized surveillance system configured distal from the plurality of components, the centralized surveillance system communicatively coupled with at least one of the plurality of components configured for mounting and operation in a vehicle. When the at least one of the plurality of components communicatively coupled with the centralized surveillance system loses communication with the centralized surveillance system for a predetermined period of time, the self-healing and recovery mechanisms component causes the system to reboot.

In some implementations, the remote surveillance system pings each of the plurality of components to check respective health statuses on a predetermined periodic basis. In some implementations, the controller periodically transmits heartbeat data to the centralized surveillance system, the heartbeat data containing information indicating respective health statuses of each of the plurality of components. In some implementations, the centralized surveillance system records the heartbeat data containing information indicating respective health statuses of each of the plurality of components. In some implementations, when the at least one of the plurality of components communicatively coupled with the remote surveillance system loses communication with the centralized surveillance system for a predetermined period of time, the self-healing and recovery mechanisms component causes the system to reboot.

In accordance with an embodiment of the present invention, a vehicle remote surveillance system is provided. The vehicle remote surveillance system includes a plurality of components configured for mounting and operation in a vehicle. The plurality of components include at least one monitoring or sensing device, a computing device having a processor, the computing device communicatively coupled with the at least one monitoring or sensing device, and a centralized surveillance system configured distal from the plurality of components, the centralized surveillance system communicatively coupled with at least one of the plurality of components configured for mounting and operation in a vehicle. When the at least one monitoring or sensing device is triggered to send out an alert notification, the centralized surveillance system receives the alert notification and records the alert notification. When the centralized surveillance system records more than a threshold number of alert notifications occurring within a predetermine period of time, the centralized surveillance system outputting a service alert notification.

In accordance with an embodiment of the present invention, a surveillance data acquisition system is provided. The surveillance data acquisition system includes a server. The server is configured to receive a selection of a geometric area defined on a geolocation map, a date selection, and a time selection. The server is also configured to identify the one or more vehicle surveillance systems recorded as being located within the selected geometric area during the selected date and the selected time, the one or more vehicle surveillance systems being dispatched in one or more vehicles. The server is further configured to automatically retrieve surveillance data originating from the one or more vehicle surveillance systems identified as being located within the selected geometric area during the selected date and the selected time, the surveillance data having been recorded at the selected date and the selected time and output the retrieved surveillance data.

In accordance with an embodiment of the present invention, a surveillance system is provided. The surveillance system includes a user module. The user module includes a geometric area selector on a geolocation map, a date selector, and a time selector. The surveillance system also includes a web server that receives from the user module a selection of a geometric area defined on a geolocation map, a date selection, and a time selection. The web server identifies one or more vehicles of the plurality of vehicles located within the geometric area at the date selection and the time selection. The surveillance system further includes an offloading server that automatically initiates requests to offloading agents for the identified one or more vehicles to upload all surveillance data for a predetermined time defined by the geometric area, the date selection, and the time selection. The offloading server receives the surveillance data uploaded from the offloading agents of the identified one or more vehicles, the surveillance data having been recorded at the selected date and the selected time. The offloading server also communicates the surveillance data to the web server, which outputs the surveillance data.

In some implementations, the date selection includes a range of dates. In some implementations, the time selection includes a range of time. In some implementations, the surveillance system further includes a status indicator for indicating an upload of recorded video for each of the identified one or more vehicles.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
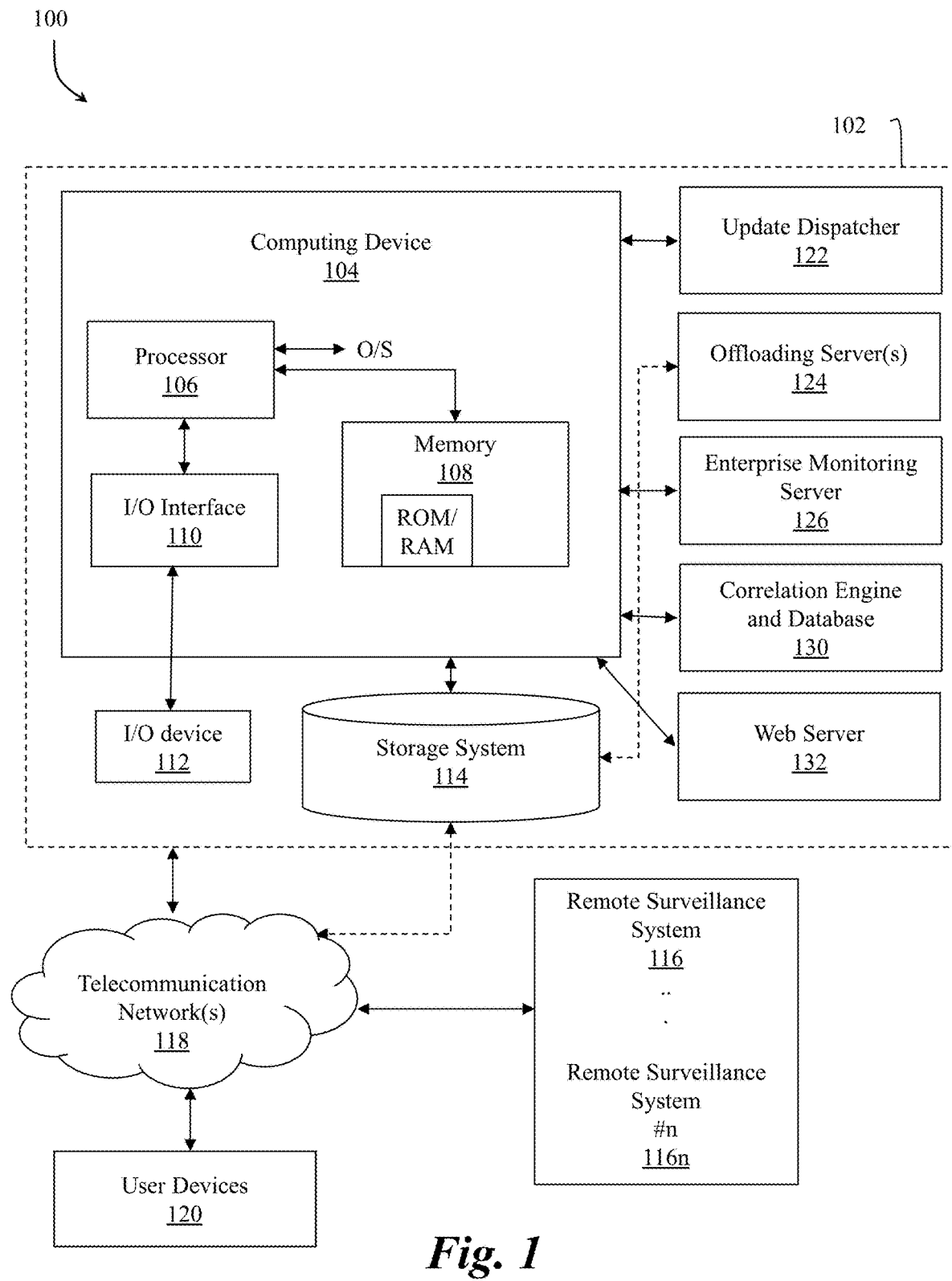
FIG. 1 is a schematic illustrating an example embodiment of a surveillance and monitoring system.

An illustrative embodiment of the present invention relates to a surveillance and monitoring system capable of aggregating surveillance data at a centralized system from a plurality of distal satellite surveillance locations. The surveillance data is aggregated in a centralized repository to be utilized by a variety of systems to provide useful information. Similarly, users can access the centralized system remotely to view and manipulate the aggregated surveillance data. In addition to the aggregating of surveillance data, the present invention can control and provide recovery mechanisms to each of the satellite surveillance systems to ensure that the surveillance data at each distal satellite location is consistently available with minimal downtime. The surveillance and monitoring system of the present invention creates a reliable, redundant, and self-healing, surveillance system, while providing numerous functional implementations of aggregated surveillance data. The present inventive system provides a marked improvement over conventional surveillance systems, particularly, for use within a plurality of distal mobile satellite surveillance locations. For example, implementations of the present invention within a public transportation network and/or across a network of fleet vehicles (distal satellite surveillance locations) can provide video surveillance up time for 98% of the time, drastically minimizing the downtime relative to prior conventional systems.

FIGS. 1 through 6, wherein like parts are designated by like reference numerals throughout, illustrate an example embodiment or embodiments of an improved centrally managed surveillance and monitoring system receiving data from a number of remote satellite surveillance systems, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts an illustrative system for implementing methods in accordance with aspects of the inventive system. In particular, FIG. 1 depicts a system 100 including a centralized surveillance system 102. As would be appreciated by one skilled in the art, the centralized surveillance system 102 can include any combination of hardware components, including a centralized server computing and repository system, a distributed server computing and repository system, a cloud computing system, or other implementations known to those of skill in the art. In accordance with an example embodiment, the centralized surveillance system 102 has a plurality of specialized server devices or core modules specifically designed and programmed to carry out specific operations and/or tasks for the overall system 100. The centralized surveillance system 102 includes a computing device 104 having a processor 106, a memory 108, an input output interface 110, input and output devices 112 and a storage system 114. As would be appreciated by one skilled in the art, the computing device 104 can include a single computing device, a collection of computing devices in a network computing system, a cloud computing infrastructure, or a combination thereof. Similarly, as would be appreciated by one of skill in the art, the storage system 114 can include any combination of computing devices configured to store and organize a collection of data in a repository. For example, storage system 114 can be a local storage device on the computing device 104 (e.g., a disk drive), a remote database facility, a cloud computing storage environment, or any other repository known in the art. The storage system 114 can also include a database management system utilizing a given database model configured to interact with a user for analyzing the database data.

In accordance with an example embodiment of the present invention, the system 100 includes a plurality of remote surveillance systems 116 configured to communicate with the centralized surveillance system 102 over a telecommunication network(s) 118. The remote surveillance systems 116 are located at different satellite locations in which it is desirable to collect surveillance data. The surveillance data collected by the remote surveillance systems 116 is communicated to the centralized surveillance system 102 for storage. As would be appreciated by one of skill in the art, the plurality of remote surveillance systems 116 can include any combination of computing devices, as described with respect to the centralized surveillance system 102 and computing device 104. For example, the plurality of remote surveillance systems 116 can be any combination of original equipment manufacturer (OEM) devices and/or specialized computing devices. In accordance with an example embodiment of the present invention, each of the remote surveillance systems 116 is communicatively attached to one or more other components at the respective remote satellite locations. For example, the remote surveillance systems 116 can be communicatively attached to other hardware devices, including but not limited to, pan-tilt-zoom (PTZ) cameras, high definition (HD) internet protocol (IP) video cameras, infrared cameras, microphones, accelerometers global positioning system (GPS) and/or any other devices known in the art that may be used in surveillance, monitoring, and/or tracking systems. As would be appreciated by one skilled in the art, communicatively attached includes any combination of wired and wireless communication hardware, formats, and protocols.

In accordance with an example embodiment of the present invention, one or more user devices 120 are able to remotely connect to the centralized surveillance system 102 and access information stored thereon (e.g., information collected from the remote surveillance systems 116). As would be appreciated by one of skill in the art, the one or more user devices 120 can include any combination of computing devices (e.g., computing device 104) as described in relation to the centralized surveillance system 102. For example, the user devices 120 can include any combination of desktop computers, laptops, tablets, smartphones, etc. Additionally, the one or more user devices 120 are configured to remotely connect directly to the remote surveillance systems 116 and access the surveillance information provided and/or stored thereon. For example, the one or more user devices 120 communicate with the remote surveillance systems 116 over a secure connection (e.g., telecommunication network(s) 118) to view live data feeds from the hardware components (e.g., HD IP camera feeds) communicatively attached to the remote surveillance systems 116.

Continuing with FIG. 1, the centralized surveillance system 102 and the remote surveillance system 116 include a combination of core modules to carry out the various functions in accordance with the present invention. In accordance with an example embodiment of the present invention, the core modules of the centralized surveillance system 102 include an update dispatcher 122, offloading server(s) 124, an enterprise monitoring server 126, a correlation engine and database 130, and a web server 132. The update dispatcher 122 is configured to monitor versions of the software and firmware on the remote surveillance systems 116, the user devices 120, and other core modules within the system 100. The offloading server(s) 124 is configured to receive offloading data (e.g., captured video feeds) from the remote surveillance systems 116 and subsequently archive the received data in a repository (e.g., on storage system 114) for use at a later time. The correlation engine and database 130 are configured to monitor devices throughout the system 100 for alerts and other events. The web server 132 is configured to provide a user interface (UI) for displaying the various information received from the remote surveillance system 116 and the other core modules. As would be appreciated by one of skill in the art, the core modules of the update dispatcher 122, the offloading server(s) 124, the enterprise monitoring server 126, the correlation engine and database 130, and the web server 132 can be implemented within the centralized surveillance system 102 as independent hardware and software components, as software components installed within the existing hardware of the centralized surveillance system 102, or a combination thereof.

Figure 2:
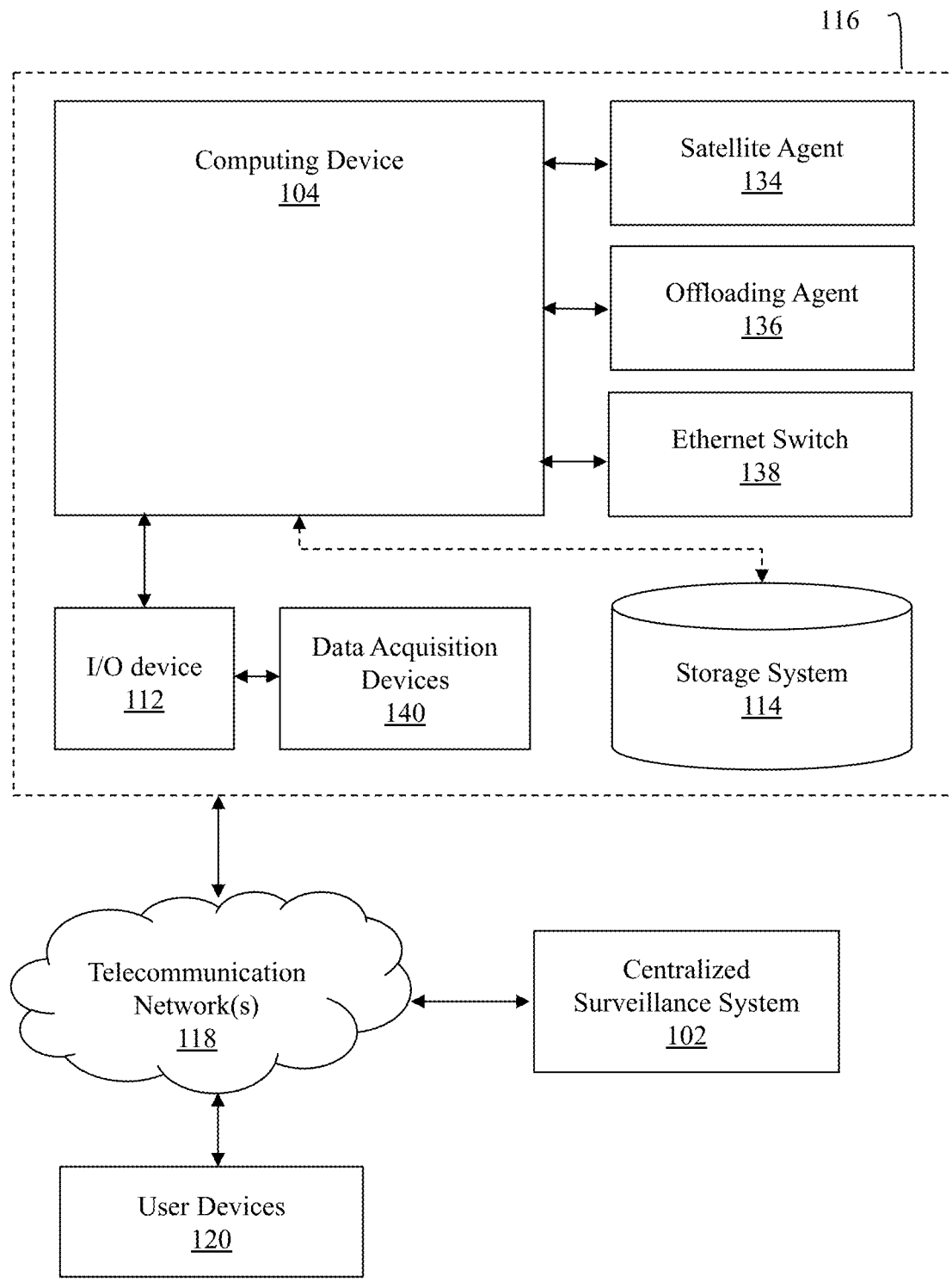
FIG. 2 is a schematic illustrating an example embodiment of a surveillance and monitoring system.

In accordance with an example embodiment of the present invention, FIG. 2 depicts an example implementation of an exemplary remote surveillance system 116 and its respective core modules, as discussed with respect to FIG. 1. In particular, FIG. 2 depicts an example implementation of the remote surveillance system 116 including a satellite agent 134, an offloading agent 136, and an Ethernet switch 138. As would be appreciated by one skilled in the art, the satellite agent 134, the offloading agent 136, and the Ethernet switch 138 can each be implemented within the computing device 104 or otherwise connected to the computing device 104. The satellite agent 134 is configured to monitor the various activities from the components within the particular satellite location of the remote surveillance system 116. For example, the satellite agent 134 can be an agent monitoring the various activities received from the surveillance hardware components (e.g., cameras, microphones, accelerometers, etc.) within a satellite vehicle. The offloading agent 136 is configured to manage the offloading of data from the remote surveillance system 116 to the offloading server(s) 124 of the centralized surveillance system 102 for archival (e.g., in the storage system 114). As would be appreciated by one of skill in the art, the Ethernet switch 138 is configured to provide communicative connections between all the components within the remote surveillance system 116 and can include any type of switch configured to route data between devices within the remote surveillance system 116. Additionally, the Ethernet switch 138 can be a separate device within the remote surveillance system 116 or it can be integrated within the computing device 104. In accordance with an example embodiment of the present invention, the remote surveillance system 116 is communicatively attached, via the Ethernet switch 138, to one or more data acquisition devices 140. The Ethernet switch 138 supplies power to the one or more data acquisition devices 140 (e.g., via power over Ethernet (POE). The data acquisition devices 140 can include any combination of devices capable of capturing surveillance data and transmitting the captured surveillance data to the remote surveillance system 116. As would be appreciated by one skilled in the art, surveillance data can include any combination of audio, visual, data reading, location data, or other information required for surveillance of a satellite location.

In accordance with an example embodiment of the present invention, the computing systems and devices 102, 104, 120, and 116 are each configured to establish a connection and communicate over telecommunication network(s) 118 to exchange data and carry out the various aspects of the present invention. As would be appreciated by one skilled in the art, the telecommunication network(s) 118 can include any combination of operable networks. For example, the telecommunication network(s) 118 may be combination of a mobile network (e.g., code-division multiple access (CDMA), global system for mobile (GSM), long-term evolution (LTE), etc.), wide area network (WAN), local area network (LAN), Wi-Fi, long range low power wireless (LoRa), or other type of network. The telecommunication network(s) 118 can be used to exchange data between the computing devices 102, 104, 120, and 116 can exchange data with the storage system 114, and/or to collect data from additional sources.

In operation, the system 100 provides technological improvements to conventional security surveillance and tracking systems using the centralized surveillance system 102, the remote surveillance system 116, and implementation of their respective core modules, as discussed with respect to FIGS. 1 and 2. In particular, the combination of the centralized surveillance system 102 and the plurality of remote surveillance systems 116 provides a system 100 enabled for reliable tracking, redundant data storage, self-healing, and accessible surveillance data at a plurality of remote locations while minimizing surveillance downtime. In accordance with an example embodiment of the present invention, the system 100 is implemented within a public transit infrastructure with a supervisory management hub. The implementation includes the centralized surveillance system 102 and the various public transit vehicles including the plurality of remote surveillance systems 116. As would be appreciated by one skilled in the art, although the present invention is described as it relates to public transportation networks and public transit vehicles, however, the present invention is not intended to be limited to this implementation. Other implementations of the inventive system can occur, such as implementations with fleet vehicles, rental cars, or other instances where there is a need for video surveillance on vehicles having a relationship with a central hub or management facility.

In accordance with the public transit example embodiment, the centralized surveillance system 102 provides the supervisory management hub of the public transportation branch with access to status information and aggregated surveillance data from various the components installed within the public transportation vehicles. The status information can include, but is not limited to, the operation status of each vehicle within the public transportation network, the location of each vehicle, and the operating status for each of the hardware components installed on and within each vehicle. Additionally, the aggregated surveillance data can include, but is not limited to, surveillance video data, audio data, vehicle velocity data, vehicle location, etc. As would be appreciated by one of skill in the art, the centralized surveillance system 102 provides users with the surveillance and status information captured by the devices communicatively attached to and/or installed within the remote surveillance system 116, from the centralized surveillance system 102 itself, and/or from other accessible data aggregated by the centralized surveillance system 102 (e.g., publically available data). For example, the centralized surveillance system 102 provides users with access to captured video data and live video data captured with network video recorders communicatively attached to the remote surveillance systems 116 located within public transportation vehicles (e.g., on trains, in buses, ferries, etc.).

Continuing with the example embodiment of public transportation networks, each of the vehicles operating within the public transportation networks that is being monitored, is equipped with the hardware and software for the remote surveillance system 116 and any data acquisition devices 140 suitable for providing surveillance data from those vehicles. As would be appreciated by one of skill in the art, the data acquisition devices 140 can include any combination of devices configured to capture data that may be useful for monitoring, performing surveillance, and managing the overall transportation network. For example, the data acquisition devices 140 can include HD IP cameras, GPS, accelerometers, thermometers, microphones, etc. Additionally, the remote surveillance system 116 can include any combination of hardware and software to communicatively receive, transmit, and store data from the data acquisition devices 140. In accordance with an example embodiment of the present invention, the data acquisition devices 140 include intermediate devices configured to receive and store data for the remote surveillance system 116. For example, the remote surveillance system 116 includes a network video recorder (NVR) (e.g., data acquisition device 140) configured to digitally record video received from one or more camera data acquisition devices 140 (e.g., PZT cameras, HD IP cameras, etc.). As would be appreciated by one of skill in the art, devices such as the NVR can be integrated within the computing device 104 of the remote surveillance system 116 or can be an independent combination of hardware and software communicatively attached to the computing device 104 of the remote surveillance system 116.

Figure 3A:
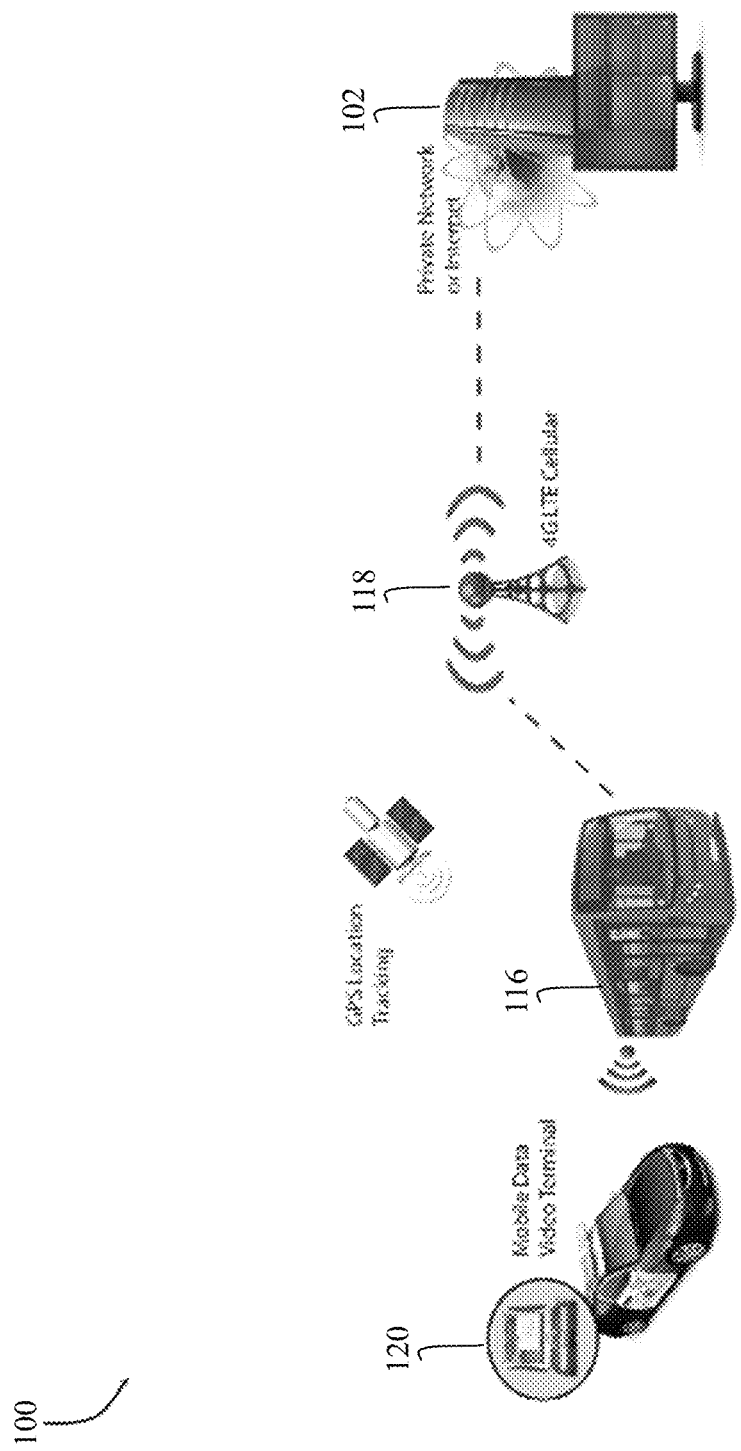
FIGS. 3a and 3b are diagrammatic representations of an example implementation of the surveillance and monitoring system.
Figure 3B:
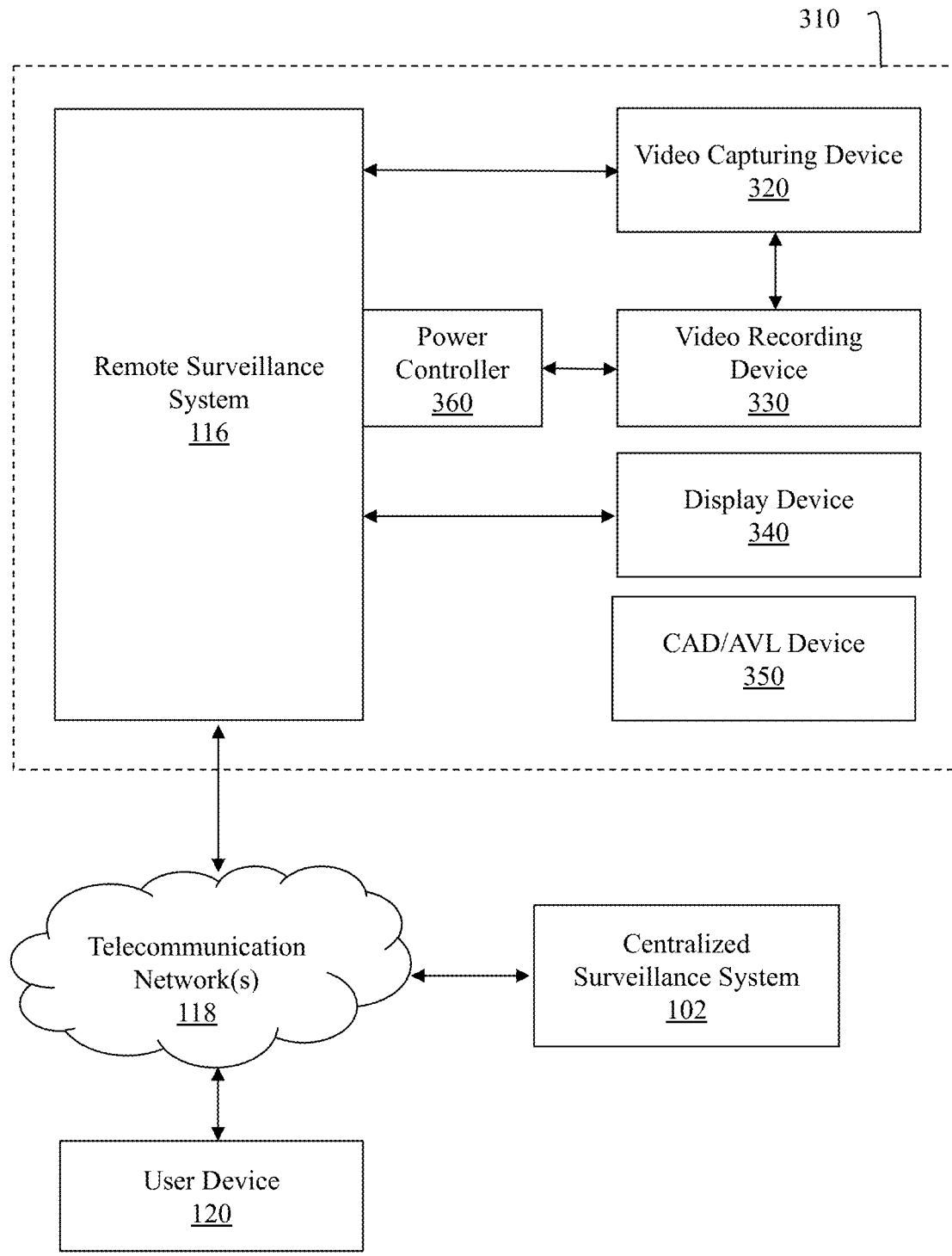

FIGS. 3*a* and 3*b* depict an example implementation of the system 100 within a public transportation network, as discussed with respect to FIGS. 1 and 2. With the hardware and software configuration depicted in FIGS. 3*a* and 3*b*, the system 100 can be used to provide surveillance data for monitoring and tracking a plurality of satellite location systems 310 (e.g., buses, trains, etc.) within the overall public transportation scheme. The satellite location system 310 can be public transportation vehicles that include the remote surveillance system 116 communicatively attached to one or more data acquisitions devices 140. In accordance with an example embodiment of the present invention, the data acquisition devices 140 can include a plurality of video capturing devices 320, a video recording device 330, a display device 340 (e.g., the I/O device 112), and a CAD/AVL device 350.

The plurality of video capturing devices 320 can include any combination of devices capable of capturing video related data. For example, the video capturing devices 320 can include PZT cameras, HD IP cameras, infrared cameras, etc. Additionally, as would be appreciated by one skilled in the art, the video capturing devices 320 can also include audio capturing devices, such as microphones. The video and audio information captured by the video capturing devices 320 is recorded and/or displayed on a number of other devices (e.g., the video recording device 330, the display device 340, the user device 120, and/or by the centralized surveillance system 102). The video recording device 330 can include any device configured to receive captured video from one or more video capturing devices 320 and record the captured video. For example, the video recording device 330 can be a computing device (e.g., computing device 104) with network video recording (NVR) or digital video recorder (DVR) software (e.g., video capturing software) installed thereon. The video recording device 330 receives the video data from the video capturing devices 320 and stores the videos within a storage device (e.g., storage system 114). As would be appreciated by one skilled in the art, the video capturing devices 320 encode and process captured video data themselves and stream the encoded data to the NVR for storage and/or remote viewing.

In accordance with an example embodiment of the present invention, the video recording device 330 stores the video data received from the video capturing devices 320. For example, the video recording device 330 can store the video data on a local or remote storage device (e.g., hard disk drive (HDD), solid state drive (SSD), CD-ROM, flash drive, cloud storage, etc.) in a format (MPEG, MKV, MP4, MOV, etc.) which can played back on another device (e.g., the display device 340). In accordance with an example embodiment of the present invention, the video capturing software is installed on the computing device 104 of the remote surveillance system 116 and the captured video data can be stored on the storage system 114. As would be appreciated by one skilled in the art, the video capturing software can be installed and the captured video can be stored on a separate independently operating computing device communicatively attached to the remote surveillance system 116 (e.g., an NVR device).

In accordance with an example embodiment of the present invention, the display device 340 includes any device capable of visually and/or audibly conveying information to one or more users. Additionally, the displayed information includes any combination of information collected, derived from and/or both from the data acquisition devices 140, video capturing devices 320, the video recording device 330, and/or other sources (e.g., data from the CAD/AVL device 350, the Internet, etc.). In accordance with example embodiments, the display device 340 is a monitor or light emitting diode (LED) display that displays a live video playback of the video data captured by the video capturing devices 320. As would be appreciated by one of skill in the art, the information includes a graphical user interface (GUI), a live or delayed video feed, or other informational display.

In accordance with an example embodiment of the present invention, the CAD/AVL device 350 includes any independently operated device providing data from the satellite location (e.g., the bus or train) of the satellite location system 310 with independent hardware and software configured to capture and deliver data to a system unrelated to the system 100 of the present invention. For example, conventional CAD/AVL systems are located on public buses and include independent GPS location devices and provide location data about the bus to the respective dispatching agency (e.g., the public transit authority).

In accordance with an example embodiment of the present invention, each of the devices included in the remote surveillance system 116 and the satellite location system 310 is commutatively attached to one another by the Ethernet switch 128. As would be appreciated by one skilled in the art, the devices, as depicted in FIGS. 2 and 3*b*, can also be communicatively attached via a combination of wired and wires communication technologies and interfaces. For example, the devices can communicate over wire via the Ethernet switch 138, Bluetooth, WiFi, Ethernet, copper wire, or a combination thereof. Additionally, the Ethernet switch 138 can provide other communication means to the devices of the satellite location systems 310. For example, the Ethernet switch 138 can include or otherwise be connected to a communication interface and/or antennae. The communication interface and/or antennae can provide means for wireless communication to other devices (e.g., the centralized surveillance system 102 or user devices 120) using Wi-Fi, LoRa, LTE, CDMA, etc. In accordance with an example embodiment of the present invention, the remote surveillance system 116 and/or the satellite location system 310 can exchange data (e.g., using the communication interface) with the centralized surveillance system 102 and the user devices 120 over the telecommunication network(s) 118, as discussed with respect to FIGS. 1 and 2. As would be appreciated by one skilled in the art, the satellite location system 310 can include an independent communications interface or utilize the communications interface of the remote surveillance system 116.

As would be appreciated by one of skill in the art, the remote surveillance system 116 can be configured to supplement or include all or a portion of the components of an overall satellite location system 310. For example, the remote surveillance system 116 can include the video capturing devices 320 or the remote surveillance system 116 can be communicatively attached to independent video capturing devices 320 as part of an independent satellite location system 310. The flexibility of the remote surveillance system 116 allows the remote surveillance system 116 to be configured as a complete overall satellite location system 310 build (e.g., designed and built at once or over a period of time) or the remote surveillance system 116 can be implemented to utilize existing systems previously in place at the satellite location system 310 (e.g., legacy systems). For example, a bus may already have preexisting devices installed thereon, such as an NVR, various cameras, and a CAD/AVL. When implemented in conjunction with preexisting systems, the remote surveillance system 116, as depicted in FIG. 2, is installed within the bus and is connected to the existing hardware elements via the Ethernet switch 138.

As would be appreciated by one skilled in the art, the data collected and stored by system 100 (e.g., the remote surveillance system 116, the satellite location system 310, and the centralized surveillance system 102) can be aggregated, derived, conveyed, in numerous fashions depending on the goals of the user. Similarly, the combination of hardware and software, as discussed with respect to FIGS. 1-3b, can be utilized in any fashion known in the art to collect and/or store any combination of data known in the art. Specific example implementations of such utilization of the collected and stored data in system 100 are described herein; however, the present invention is not intended to be limited to these particular example implementations. These example implementations are for illustrative purposes, and the collected and stored data from system 100 can be utilized in a number of different ways, as would be appreciated by those of skill in the art.

Health Monitoring and Troubleshooting Methodology

In accordance with an example embodiment of the present invention, the system 100 utilizes the enterprise monitoring server 126 to actively monitor each vehicle including a remote surveillance system 116 within a public transportation network. The enterprise monitoring server 126 relies on surveillance data collected from multiple independent systems and devices, including the systems and devices of the present invention, to produce a redundant vehicle tracking and status monitoring methodology. In accordance with an example embodiment of the present invention, the enterprise monitoring server 126 supervises an online status of each vehicle within the public transportation network. The online status for a vehicle can include monitoring whether or not the vehicle is active within the public transportation network (e.g., active on a route), whether or not the vehicle is transmitting surveillance data, health data related information, or other information to the centralized surveillance system 102, whether or not the vehicle is transmitting from an anticipated location within the public transportation network (e.g., from the route, in the hub, etc.), or any other status indicators as would be appreciated by those of skill in the art.

In accordance with an example embodiment of the present invention, in addition to monitoring the online status of the vehicles, the enterprise monitoring server 126 receives additional information from the remote surveillance system 116. In particular, the remote surveillance system 116 on the vehicles periodically transmits reports and health related messages to the enterprise monitoring server 126. The reports and health related messages periodically transmitted by the remote surveillance system 116 on each of the vehicles include a healthy and active message (e.g., a heartbeat message) with vehicle identification data, timestamp data, location data (GPS information), accelerometer data (e.g., travel speed), and any other data gathered from the vehicle at the time of transmission to the enterprise monitoring server 126. The frequency of such periodic transmissions can be determined by those of skill in the art for the particular system implementation.

In accordance with an example embodiment of the present invention, the remote surveillance system 116 also transmits a health status message including additional report information based on health tests performed on each individual device within a satellite location system 310. In particular, the health status message can include specific health information as to whether a particular device is active, inactive, whether those devices are operating properly, and other status indicators known in the art. Similarly, the report can include indications that the video capturing devices 320 are online/offline, whether the video recording device 330 is not receiving video stream from the video capturing devices 320, whether the video recording device 330 is experiencing any hard drive failure, any devices experiencing excessive rebooting etc.

Additionally, the enterprise monitoring server 126 receives a number of different status message related data. In particular, the enterprise monitoring server 126 can receive status messages including information for rebooting statuses of particular devices, storage space available and unavailable for storage devices, how much video retainage is available on the video recording device 330, and check software statuses for software running on any of the devices (e.g., video recording software on the video recording device 330), a number of days of video retention or amount of free drive space on the video recording device 330. Based on the heartbeat messages, the health status messages, and the status information included therein, the enterprise monitoring server 126 identifies when any of the devices within a satellite location system 310 is not responsive and/or operating properly and initiates immediate mitigating action(s) in real time. As would be appreciated by one of skill in the art, the heartbeat messages, health status messages, and other status messages can be transmitted at different rates with different priorities and include different combinations of information. For example, the remote surveillance system 116 can send out hundreds of heartbeats messages between sending a batch of health status messages and other status messages.

In accordance with an example embodiment of the present invention, the enterprise monitoring server 126 performs mitigating corrective actions for the recovery of a non-responsive or malfunctioning device within the satellite location system 310. For the initiating recovery, the enterprise monitoring server 126 transmits instructions to the remote surveillance system 116 to activate, deactivate, and/or reboot a particular device or system. As would be appreciated by one skilled in the art, the instructions can be automatically initiated instructions or user initiated instruction(s) transmitted to the device or system within the satellite location system 310. In one example implementation, upon a determination that one or more video capturing devices 320 are not operating properly, the enterprise monitoring server 126 automatically transmits instructions to the remote surveillance system 116 to reboot the particular videos capturing devices 320. As would be appreciated by one skilled in the art, the enterprise monitoring server 126 can send instructions to activate, deactivate, and/or reboot any of the devices described with respect to FIGS. 1-3b.

Subsequent to the enterprise monitoring server 126 transmitting instructions to activate, deactivate, and/or reboot, a device, the enterprise monitoring server 126 accesses the targeted device and/or system remotely to determine whether the corrective action was carried out and/or whether it was effective. Continuing the previous example, the enterprise monitoring server 126 can remotely access the video recording device 330 in question to determine whether it is receiving video data streams from the previously problematic video capturing devices 320. In accordance with an example embodiment of the present invention, the enterprise monitoring server 126 initiates additional mitigating actions to the devices and systems discussed in FIGS. 1-3b when necessary (e.g., to continue troubleshooting a particular device). For example, the enterprise monitoring server 126 can cycle through internal video capturing devices 320 and can send instructions to shut down particular video capturing devices 320 if those video capturing devices 320 go down or the enterprise monitoring server 126 can send instructions to cycle to next available video capturing devices 320 for display on the display device 340.

Redundant Vehicle Location Tracking and Monitoring Methodology

In accordance with an example embodiment of the present invention, a redundancy in monitoring is created by the enterprise monitoring server 126. The enterprise monitoring server 126 creates the monitoring redundancy by monitoring, obtaining, and/or comparing data provided by two independent systems within the same satellite location system 310. For example, the enterprise monitoring server 126 utilizes location data (e.g., GPS data) provided in the heartbeat messages of the remote surveillance system 116 and simultaneously obtains location data provided by an independently operating device located within the same satellite location system 310. In particular, the enterprise monitoring server 126 compares status data confirming whether a separate system, that is not part of the remote surveillance system 116 (e.g., the CAD/AVL device 350), is operating in real-time on the vehicle with status data confirming whether the vehicle monitoring system, within the remote surveillance system 116, is also operating in real-time on the vehicle. More specifically, the enterprise monitoring server 126 verifies a real-time operating status of the vehicle based on a comparison of status data for the vehicle from the remote surveillance system 116 and publically available status data associated with the vehicle from a remote system (e.g., derived from the CAD/AVL device 350 that is not part of the remote surveillance system 116). In other words, the enterprise monitoring server 126 can verify (redundantly) whether a vehicle is operating appropriately (e.g., within a given location) by comparing status information (e.g., location information) from devices within the remote surveillance system 116 and a device operating independently from the remote surveillance system 116 (CAD/AVL device 350) within the same vehicle. As would be appreciated by one of skill in the art, the location data for the independent CAD/AVL can be obtained by leveraging publically available location data of the CAD/AVL. For example, the location data can be leveraged by accessing a third party web site or web application program interface (API) that has made the CAD/AVL information publically available.

In operation, with two sets of location data, the enterprise monitoring server 126 can compare the location data and/or other data from both separate device sources (e.g., the remote surveillance system 116 and the CAD/AVL device 350) and attain a number of different determinations. In accordance with an example embodiment of the present invention, the publically available location information from the CAD/AVL device 350 is collected and transformed into a list format to be compared against the GPS information obtained by the enterprise monitoring server 126 from the remote surveillance system 116. For example, the enterprise monitoring server 126 can check to determine whether both devices and/or systems (e.g., the remote surveillance system 116 and the CAD/AVL device 350) are providing the same location data at the same time periods. The enterprise monitoring server 126 can exclude all vehicles that have location information from the CAD/AVL device 350 that match the respective GPS information from that vehicle's remote surveillance system 116. Additionally, the enterprise monitoring server 126 can exclude all vehicles that have CAD/AVL devices 350 but are not equipped with a remote surveillance system 116. The remaining vehicles in the list (e.g., vehicles with a remote surveillance system 116 with GPS information not matching the location information leveraged from the CAD/AVL device 350) can be flagged for further monitoring and/or troubleshooting. For example, the enterprise monitoring server 126 can ping the remote surveillance system 116 to determine if the remote surveillance system 116 is responsive/active. As would be appreciated by one skilled in the art, the enterprise monitoring server 126 can obtain location information from the remote surveillance system 116 in formats other than GPS (e.g., triangulation).

In accordance with an example embodiment of the present invention, the enterprise monitoring server 126 uses a separate GPS device for GPS fencing to determine whether the vehicle is inside or outside of a particular location or area by comparing location data from the CAD AVL to the GPS data of the remote surveillance system 116 to determine whether they match within a predetermined tolerance. In accordance with an example embodiment of the present invention, the enterprise monitoring server 126 can use the data to determine if a vehicle should be active and/or at a certain location and determining when to expect the vehicle to be located and receive data from that vehicle. Additionally, determination of where the vehicle is located and where the vehicle will be at a future time can be used to send alerts to users through the centralized surveillance system 102 and the user devices 120. For example, an alert can be issued when a vehicle has returned to an area defined as the transportation hub or depot.

When there is an inconsistency in the comparison of location information, the enterprise monitoring server 126 determines whether one system is down or malfunctioning and takes the proper corrective action (e.g., reboot the remote surveillance system 116, record an alert, etc.). Using the redundant location data from the two (or more) independent systems, enables the enterprise monitoring server 126 of the centralized surveillance system 102 to accurately track the location of a particular vehicle and provide alerts when one of the systems is down or is not operating as intended or desired. For example, when the location information on the remote surveillance system 116 indicates that a vehicle has stopped at a particular location, but the leveraged public location data from the CAD/AVL system indicates that the vehicle is still moving and/or at another location, the enterprise monitoring server 126 initiates an alert related to the inconsistency.

In accordance with an example embodiment of the present invention, each alert initiated by the enterprise monitoring server 126 is stored by the centralized surveillance system 102 and based on predetermined criteria can also issue a service alert notification. For example, when more than a predetermined number of alert notifications have been recorded by the centralized surveillance system 102 within a predetermined period of time (for a particular issue), the enterprise monitoring server 126 outputs a service alert notification. As would be appreciated by one of skill in the art, the alert notification triggered by the centralized surveillance system 102 can include any method for notifying a user that additional action is required. For example, the alert notification can include a pop-up notification on management software, a short message service message, an email, etc. Additionally, the alert notification can include any type of message or instruction to the user. For example, the alert notification can instruct the user to pull a particular vehicle from service or may be a general alert indicating that a particular vehicle has been experiencing a particular problem(s).

In accordance with an example embodiment of the present invention, an alert notification and recordation scheme are implemented with respect to receiving data at the centralized surveillance system 102 from the remote surveillance system 116. Continuing the example, alerts are initiated and recorded at the enterprise monitoring server 126 of the centralized surveillance system 102 in response to not receiving data from the remote surveillance system 116 over a threshold period of time in conjunction with the leveraged comparative CAD/AVL data. In particular, when data leveraged from the CAD/AVL system indicates that a vehicle is in active service on a route, but the enterprise monitoring server 126 is not receiving data from the remote surveillance system 116 for that vehicle, an alert is triggered. The alerts are recorded and an alert notification can be issued when a number of alerts or duration of the alerts for a particular vehicle meets or exceeds a predetermined threshold. As would be appreciated by one of skill in the art, there can be many legitimate reasons that the remote surveillance system 116 cannot communicate to the enterprise monitoring server 126 (e.g., poor LTE connection, the system is rebooting, the vehicle is shut off and the CAD/AVL system hasn't recognized this yet, etc.). As such, the alert condition must exist for a long enough threshold of time (e.g., two hours) to be sure one of these legitimate reasons is not the cause of the issue.

In accordance with an example embodiment of the present invention, alarms self-clear when the issue causing the alert has been resolved. For example when a device reboot corrects the issue, the alert clears because the problem has been auto-corrected. As would be appreciated by one of skill in the art, alerts can be recorded based on any devices and/or systems that are not operating properly (e.g., according to the health tests, heartbeat messages, health status messages, etc.).

In accordance with an example embodiment of the present invention, the alert indications are historically tracked by the centralized surveillance system 102 in a database, table, or other data structure format known in the art. The information stored in the data structure is displayed to a user via the system software and/or webpage access. For example, the alerts can be displayed on chart that shows historical alerts for vehicles over a period of time. The historical alert information displayed in the chart can be used by a user or system to identify any intermittent problems that are repeatedly being generated but are subsequently cleared prior to an alert notification being issued to a user (e.g., such as a loose wire, bad LTE service area, etc.) In particular, the intermittent problems may not exist for a sufficient time duration (e.g., less than two hours) to trigger an alert notification for additional action (e.g., for pulling the vehicle for inspection). When this occurs, the chart can be used to identify the outliers that are generating the most alerts over time without causing an alert to be triggered, so the core problem can be identified and cured by the user.

As would be appreciated by one of skill in the art, many types of redundant data and/or alert notification system can be used in a similar manner. For example, redundant video feeds from two independent systems can be used in comparison or to supplement missing video data feeds. Similarly, alerts can be triggered by the remote surveillance system 116, and stored when video data feeds have gone down. These alerts can be used in a similar manner as the alerts discussed with respect to the enterprise monitoring server 126 and CAD/AVL data. The redundancy and status monitoring by the enterprise monitoring server 126 for each system can create a fault detection and recovery mechanism that reduces an amount of down time of any of the data acquisition devices 140 of the remote surveillance systems 116.

Physical Security Information Management (PSIM)

In accordance with an example embodiment of the present invention, users access information, provide instructions, receive notifications, and other operations using a physical security information management system (PSIM) integrated with the centralized surveillance system 102. The PSIM is a software interface used to consolidate actionable information or situations that can be derived from the components and devices throughout the system 100. As would be appreciated by one skilled in the art, in accordance with example embodiments of the present invention, the PSIM system is installed and accessed through the centralized surveillance system 102 and/or the remote surveillance system 116. The PSIM system is responsible for managing all of the communication between devices within the system 100 and providing a user interface for users to access the system 100 and the information stored thereon. In particular, the PSIM aggregates event messages received by the centralized surveillance system 102 and utilizes the correlation engine and database 130 to review each event message and apply a list of user defined rule sets to each event message. For example, when an event message meets the conditions set forth in the user defined rules, then the corresponding rule dictates the action to be taken by the centralized surveillance system 102. Additionally, some of the actions can be presented to a user in the form of an alert or alarm that appears in a grid within the user interface for the PSIM.

In accordance with an example embodiment of the present invention, the rule sets associate the alerts or alarms with the appropriate video capturing devices 320 for live and recorded playback in response to an event message, such that the captured videos are used by the video recording device 330 to create a clip of the captured video and save the video for later retrieval (e.g., forensic, evidence, etc.). In particular, the correlation engine and database 130 are responsible for accessing vehicle rules 510 stored in the centralized surveillance system 102, watching for vehicle related event messages or alerts that are related to those vehicle rules 510, and responding accordingly. As would be appreciated by one of skill in the art, the vehicle rules 510 can include logic for handling particular events or alarms and triggering the necessary response to such events or alarms. In response to identifying a vehicle related event or alert, the correlation engine and database 130 can create a PSIM situation for reacting to the event or alert, if anything. For example, when the correlation engine and database 130 identifies an alert received from a vehicle indicating that a video capturing device 320 is not streaming video data, the correlation engine and database determine what the appropriate action for addressing that alert is, by accessing the vehicle rules 510. In this situation the appropriate action may include rebooting the video capturing device 320 and the correlation engine and database 130 can provide instructions to be sent by the centralized surveillance system 102 and/or user to the remote surveillance system 116 to reboot the video capturing device 320. As would be appreciated by one skilled in the art, any operable combination of software can be used to perform the functions in place of the PSIM interface.

In accordance with an example embodiment of the present invention, the correlation engine and database 130 are responsible for receiving events, alarms, and/or alerts from the plurality of remote surveillance systems 116 and/or the centralized surveillance system 102, processing the events, alarms, and/or alerts, and providing the appropriate reaction to the events, alarms, and/or alerts to the centralized surveillance system 102 and/or remote surveillance system 116. In particular, the correlation engine and database 130 utilizes a PSIM proxy 506 to monitor all of the events, alarms, and alerts from the devices throughout system 100 and create PSIM situations in response to the events, alarms, and alerts. The PSIM proxy 506 is a monitoring service that detects an event triggered within the system 100 (e.g., the panic button was pressed by a vehicle operator, the accelerometer has detected erratic driving, detection of an accident, etc.). In accordance with an example embodiment of the present invention, the PSIM proxy 506 "packages up" the triggered event and transmits the packaged event to the PSIM web API. Additionally, simultaneously or subsequently, the PSIM proxy 506 can also create PSIM situations in the centralized surveillance system 102 in response to the triggered event.

As would be appreciated by one skilled in the art, the PSIM situations can include providing analysis of the events, alarms, and alerts, verification of the events, alarms, and alerts, resolution for the events, alarms, and alerts (e.g. step by step instructions to resolve the events, alarms, and alerts), reporting of the events, alarms, and alerts, and creating an audit trail of the events, alarms, and alerts. For example, the alerts/alarms can be presented to a user in the user interface, and if the user clicks on the alert/alarm a separate window opens to display more detailed information as well as a recorded video playback from where the event was triggered (e.g., at the remote surveillance system 116 reporting the event). Additionally, the event playback can include a buffer period before and after the time that the event was triggered. Based on the detailed information for the event, the user can utilize the user interface to implement a standard operating protocol (also displayed on the detailed information) designed for that type of alert/alarm. Ultimately the user/operator makes a decision to take some action, such as dispatch appropriate responders, to forward/assign the alert/alarm to another user or group, or to simply clear the alert/alarm. The functionality provided by the PSIM situations can instruct personnel how to handle the events, alarms, and alerts as they occur.

In accordance with an example embodiment of the present invention, the correlation engine and database 130 receives new PSIM events from hypertext transfer protocol (HTTP) POST requests. The PSIM events can be injected using a HTTP POST proxy 508 and can be transmitted to the PSIM correlation engine for processing. In particular, the HTTP POST proxy 508 determines that an event occurred by monitoring the event messages produced by the various components within system 100 (e.g., the enterprise monitoring server 126, the web server 132, the remote surveillance system 116, etc.). The HTTP POST proxy 508 creates the appropriate event message in response to the triggered event and submits it to the PSIM via HTTP POST 508. The event message includes all the fields required by the PSIM completed, such as event description, event time/date, originating system, event identifier, etc.

Remote Surveillance, Monitoring, and Health Recovery Methodologies

In accordance with an example embodiment of the present invention, the system 100 includes management software for the centralized surveillance system 102 configured to enable users to access to information for surveillance, status and health monitoring, self-healing, and recovery mechanisms. As would be appreciated by one skilled in the art, the management software can be a web based interface, a user interface within the centralized surveillance system 102, integrated with the PSIM, or a combination thereof. In the example embodiment, the web server 132, within the centralized surveillance system 102, provides the mechanism for users to access, manage, and view all of the data aggregated at the centralized surveillance system 102. In particular, the web server 132 provides a graphical user interface (GUI) with live dynamic vehicle fleet monitoring with status and health information for each of the vehicles within the fleet. For example, the GUI can provide fleet maps detailing all of the status, location, and alert information available at the centralized surveillance system 102, as discussed with respect to FIGS. 1-3b.

In accordance with an example embodiment of the present invention, the web server 132 provides users with mechanisms to manage and track the vehicles throughout the fleet using a GUI. The GUI provides an executive dashboard in which a user can track, monitor, and provide modifying instructions to each of the devices within the system 100. In particular, the GUI provides an interface in which the status information (e.g., online status, location, etc.) can be viewed for each of the vehicles within a fleet and their respective hardware devices. As would be appreciated by one of skill in the art, the tracking can provide any combination of live data and historical data available to the centralized surveillance system 102, as discussed with respect to FIGS. 1-3b. For example, the tracking can include live tracking, historical tracking, service history, etc.

In accordance with an example embodiment of the present invention, the web server 132 provides users with means for transmitting instructions, requesting information or data, or performing mitigating actions according to a PSIM situation for the remote surveillance systems 116. The transmission of instructions can include any actions that can be triggered by the centralized surveillance system 102 to the remote surveillance systems 116. For example, the user can use the GUI to provide instructions to a vehicle to reboot a particular device or system. As would be appreciated by one skilled in the art, the user can use the GUI to activate, deactivate, reboot, or perform any other operation to any device in connection with the system 100. For example, the user can remotely initiate operations on an overall remote surveillance system 116 and/or particular devices (e.g., video capturing devices 320, video recording device 330, display device 340, etc.) within the remote surveillance system 116. Similarly, the user can request information by using the GUI to transmit a request for particular data or video feeds for a vehicle. For example, the user can use the GUI to transmit a request to a vehicle's live and/or recorded video feed from that vehicle's remote surveillance system 116. In the event that an alert or alarm is triggered, the user can use the GUI to provide a response to the event by following instructions provided by a PSIM proxy 506. For example, the GUI can provide the user with step by step instructions for managing the alert or alarm.

In accordance with an example embodiment of the present invention, the web server 132 provides the user access to the archived data within the system 100. The archived data can include all of the data collected and aggregated by the centralized surveillance system 102 from the plurality of remote surveillance systems 116. The archived data can include previously uploaded video feeds, heartbeat information, health status messages, alert/alarm history logs, historical mitigation actions taken by users, and any other information stored by the centralized surveillance system 102. As would be appreciated by one of skill in the art, the data can be displayed to the user in any combination of formats. For example, the data can be displayed in tabular format, textual format, graphical format, a chart, etc.

In accordance with an example embodiment of the present invention, the web server 132 provides user access to all of or portions of the data available within the centralized surveillance system 102 from remote user devices 120. The user devices 120 can access the data using a GUI similar to the interface discussed with respect to the centralized surveillance system 102 management software of the web server 132. In accordance with an example embodiment of the present invention, the information that the GUI provides to the user devices 120 can be limited in functionality from the management software for the centralized surveillance system 102. For example, the data available to the user devices 120 can be limited to monitoring vehicle locations, performing a live look-in to the video feeds on a vehicle, and requesting video download for particular vehicles (e.g., from the vehicle directly or from the centralized surveillance system 102). As would be appreciated by one of skill in the art, the user devices 120 can access the data in the centralized surveillance system 102 through the user of a software application or mobile application installed on their device or through a website or portal.

In accordance with an example embodiment of the present invention, the user devices 120 utilize the GUI to act as a mobile data terminal scanner 512. The mobile data terminal scanner 512 provides users (e.g., law enforcement officers) with the ability to quickly and easily connect the user device 120 (e.g., mobile terminal computer installed in the police vehicle) to any equipped vehicles (e.g., public transportation buses) within Wi-Fi range. The mobile data terminal scanner 512 continuously scans every few seconds for compatible vehicles in range (e.g., vehicles with remote surveillance systems 116).

In accordance with an example embodiment of the present invention, the vehicles (e.g., with the remote surveillance systems 116) do not broadcast their service set identifiers (SSID), so the mobile data terminal scanner 512 can only see the media access control (MAC) addresses of the Wi-Fi access point on the broadcasting vehicles. The mobile data terminal scanner 512 periodically (e.g., once a day) downloads the most recent list of remote surveillance system 116 equipped vehicles. The list contains the MAC address for the access points, the vehicle IDs, SSIDs, Wi-Fi credentials; type of video recording software is installed, etc. The mobile data terminal scanner 512 compares all hidden SSID's to the downloaded list to determine which vehicles are remote surveillance system 116 equipped vehicles. Based on the comparison, the mobile data terminal scanner 512 displays the vehicle ID's of the vehicles within range of the user device 120. The user can then access any of the displayed vehicles within range of their user device 120. For example, a law enforcement officer can select the vehicle of interest, using the touchscreen of the mobile data terminal, to establish a Wi-Fi connection to the vehicle. After a connection is established with a vehicle, the mobile data terminal scanner 512 can launch access data within the vehicles system. For example, the mobile data terminal scanner 512 can launch a client to display a preselection of camera views, automatically download new vehicle identifications and passwords, request status information, video feeds, change views, playback video, capture clips, etc. for those vehicles.

In accordance with an example embodiment of the present invention, the web server 132 implements real-time health monitoring for the plurality of remote surveillance systems 116. Additionally, the web server 132 provides users with access to the status information, health status messages, heartbeat messages, etc., via the management GUI for the centralized surveillance system 102. In particular, the web server 132 runs periodic checks for heartbeat messages, health status messages, other status information, and alerts/alarms for each of the vehicles within the system 100. The information received during the periodic checks is stored within the centralized surveillance system 102 (e.g., storage system 114) and can be automatically and/or manually reviewed for any potential issues.

When the web server 132 does not receive information from a remote surveillance system 116 during a periodic check, an alert is created and/or mitigating action can be is taken. For example, the web server 132 provides mitigating action by proactively attempt to contact the remote surveillance system 116 to request a status check-in. Similarly, when a remote surveillance system 116 transmits status information with an indication that a particular device within that satellite location system 310 is non-responsive, an alert and/or mitigating action is taken by the web server 132. For example, the web server 132 provides mitigating action by instructing the remote surveillance system 116 for the problematic system or device within the satellite location system 310 to reboot. In accordance with an example embodiment of the present invention, the web server 132 follows a checklist for performing mitigating actions and escalation of those actions. In one example, the web server 132 initiates contact with the remote surveillance system 116, sends an alert if the web server 132 cannot establish contact, places the remote surveillance system 116 on a watch list in case communication is down (e.g., lost LTE connection), issues an alarm notification if the remote surveillance system 116 remains offline for an predetermined period of time, and automatically clears the alarm when the remote surveillance system 116 comes back online and responds to communication from the web server 132.

In accordance with an example embodiment of the present invention, the functionality of the GUI provided by the web server 132 further includes functionality provided by the update dispatcher 122. The update dispatcher 122 automatically distributes software and firmware patches to all the of the devices within the system 100. Based on the status information received by the centralized surveillance system 102, the update dispatcher 122 determines what software and firmware is installed and what respective version levels are running on each device within the remote surveillance system 116 on each vehicle. When the update dispatcher 122 identifies an out of date piece of software or firmware, an instruction is provided to the out of date system or device to update it to the latest version. As would be appreciated by one of skill in the art, the instruction can be automatically initiated or can be sent as a notification to a user to provide instructions through the GUI to initiate automatic or manual installation of the update. Additionally, the update dispatcher 122 can provide the necessary installation package (e.g., an exe file, zip file, etc.) to perform the update to the target system or device. In accordance with an example embodiment of the present invention, the update dispatcher 122 can monitor a vehicle status to determine when a vehicle is online or has come online and push the necessary update to the target systems or devices on that vehicle at that time.

Automated Monitoring and Health Recovery Methodology for Remote Surveillance Systems In accordance with an example embodiment of the present invention, the remote surveillance system 116 performs its own health monitoring, self-healing, and recovery mechanisms within each satellite location system 310. In particular, an agent operating within the remote surveillance system 116 (e.g., an agent device) periodically pings the different devices in the satellite location system 310 to check their respective health statuses and determine if any mitigation or troubleshooting actions are needed. As would be appreciated by one of skill in the art, any of the devices in the satellite location system 310 can be the agent device responsible for the health monitoring, self-healing, and recovery mechanisms. For example, computing device 104 and/or the video recording device 330 can include the customized agent software for transmitting the heartbeat, status information, and health messages to the centralized surveillance system 102. After pinging each of the devices at a satellite location system 310, the agent device for the remote surveillance system 116 can transmit the health monitoring and recovery information to the centralized surveillance system 102 in the form of heartbeats, status information, and/or health messages.

In accordance with an example embodiment of the present invention, a power controller 360 monitors power statuses for each of the devices within the satellite location system 310 for the vehicle. In particular, the power controller 360 monitors two inputs, the inputs including an ignition source and an input/output pin from the video recording device 330. The power controller 360 is a separate device that is located anywhere on the vehicle so long as it can connect to the remote surveillance system 116 and the Ethernet switch 138. For example, the power controller 360 can be mounted next to the video recording device 330 in a larger enclosure that contains the video recording device 330, a switch, and relays. Additionally, the power controller 360 performs additional power on and power off operations for the devices within the satellite location system 310 based on a power status for the agent computing device (e.g., computing device 104 and/or video recording device 330) in the remote surveillance system 116. The logic of the power controller 360 monitors the two inputs for the vehicle's ignition state (e.g., via the ignition source input) and a power state of the video recording device 330 (e.g., via the input/output pin for input of the video recording device 330). The power controller 360 ensures that the video recording device 330 turns on when the ignition for the vehicle is activated and that all other devices within the satellite location system 310 (e.g., video capturing devices 320) receive power when the video recording device 330 is powered on. For example, when the ignition source of the vehicle is turned on, the corresponding input for the power controller 360 detects the on power state. The inputs of the power controller 360 also dictates activating and/or deactivating power to other devices. For example, if the power controller 360 detects power from the ignition source input, then the power controller engages the relays to deliver power to the Ethernet switch 138 for powering communication devices (e.g., LTE, radio, etc.).

In accordance with an example embodiment of the present invention, the agent device within the remote surveillance system 116 also monitors the ignition state of the vehicle and performs specific actions based on the ignition state. In particular, when the vehicle is turned off, the agent device will allow the video recording device 330 computer to run for a predetermined period of time and then instruct the video recording device 330 to shut down. Similarly, the power controller 360 detects that the video recording device 330 has turned itself off and then it in turn shuts down the other devices of the satellite location system 310 by cutting off their power.

In accordance with an example embodiment of the present invention, the agent device connects to the video recording device 330 and pulls status information from each of the video capturing devices 320. In the event that the video recording device 330 or one or more of the video capturing devices 320 are not responsive (e.g., down or not communicating), the agent device attempts to reboot the non-responsive devices. As would be appreciated by one of skill in the art, the agent device also performs other mitigating actions for non-responsive devices. For example, for non-responsive video capturing devices 320, the agent device can cycle through internal cameras, can shut down any video capturing device 320 that are down, can cycle to next available video capturing device 320 (for display on the display device 340), etc.

In accordance with an example embodiment of the present invention, the agent device follows a mitigation protocol and escalation plan when performing self-healing actions. For example, the agent device can start by initiating reboots for non-responsive devices, the agent device can issue an alert to the centralized surveillance system 102 for remote mitigation actions, and lastly the agent device can issue a notification for technician for troubleshooting/repair if the previous mitigating actions fail. As would be appreciated by one of skill in the art, the agent device can monitor and manage any devices connected to the remote surveillance system 116 within the satellite location system 310. For example, the agent device can reboot an LTE router/antenna if the LTE signal in the event that data is not being received and/or transmitted.

In accordance with an example embodiment of the present invention, the satellite location system 310 includes a number of other devices that can be monitored, managed, and repaired by the agent device. For example, the satellite location system 310 includes an on board display for relaying live video feed(s) to the passengers on the vehicle, a status LED indicating the operating status of one or more systems within the satellite location system 310, and switches (e.g., foot switch, covert switch, panic switch, etc.) for initiating a video recording upload. Each of these additional devices can include particular implementations that need to be monitored and monitored by the agent device. In particular, the agent device can update the LED indicator to indicate the operating status of the overall remote surveillance system 116. For example, the agent can indicate a green LED to indicate that all systems are operational and a red LED to indicate that a device or system is non-responsive. Additionally, the agent device can monitor the switches and initiate an action when one of the switches has been activated by a user (e.g., initiate an offload when a panic switch is activated). In accordance with an example embodiment of the present invention, the combination covert switch, foot switch, and status LED can be combined within a single device 514.

In accordance with an example embodiment of the present invention, the agent device pings the various devices within the satellite location system 310 to determine their respective health statuses. Based on the responses from the various devices, the agent can create a health status message and other status messages to be stored in the local storage device for transmission to the centralized surveillance system 102. The agent device can periodically transmit heartbeat messages, health status messages, and other status messages to the centralized surveillance system 102 including the health information obtained from the devices within the satellite location system 310. The heartbeat can contain vehicle ID, timestamp, GPS and accelerometer data. The health status messages are varied based on the health test performed on the various devices within the satellite location system 310 (e.g., camera online/offline query, hard drive failure indication, excessive rebooting etc.). The other status messages can include other information derived from the health status tests, including but not limited to a number of days of video retention or amount of free drive space.

In accordance with an example embodiment of the present invention, when one of the devices within the satellite location system 310 becomes unresponsive for a predetermined period of time, the agent device of the remote surveillance system 116 initiates a self-healing and recovery mechanisms instruction causing the non-responsive devices or the entire system to reboot. In particular, the agent device makes an attempt to determine a point of failure and restart any devices that may be the cause of the determined point of failure. For example, the agent device can lose communication with one of the video capturing devices 320 but may determine that an intermediary device is the issue and initiate instructions to reboot the intermediary device rather than the video capturing device 320. Similarly, there are conditions where the agent device will determine that it is the point of failure and will initiate a reboot of its own system.

Video Offloading

In accordance with an example embodiment of the present invention, the system 100 is configured to offload data from the plurality of remote surveillance systems 116 to the centralized surveillance system 102 for long time storage. The data offloading is performed by the combination of the offloading server(s) 124 on the centralized surveillance system 102 and the offloading agent 136 on the remote surveillance system 116. The offloading agent 136 communicates with the local vehicle archiver 502 on the remote surveillance system 116 to offload the various data stored by the remote surveillance system 116. The local vehicle archiver 502 can include all the data stored by the remote surveillance system 116 during vehicle operation. For example, the local vehicle archiver 502 can include health status records, video capture recordings, logged alarms, and other data. In accordance with an example embodiment of the present invention, the offloading agent 136 offloads merely a portion of all the stored data that has been tagged by an alarm, event, or request. For example, a particular set of video data could be tagged for offload when a vehicle operator activated a panic button. By limiting the offload to only data items that are tagged, the offload time is reduced and stored space in the centralized surveillance system 102 storage system 114 can be efficiently utilized. As would be appreciated by one skilled in the art, the offloading agent 136 can also synchronize and offload all the data stored on the remote surveillance system 116 that had not been previously offloaded to the centralized surveillance system 102. Additionally, the offloading agent 136 can be responsible for initiating and monitoring the connection to the offloading server(s) 124 when they are in range and/or available. Likewise, the offloading server(s) 124 can initiate and monitor the connection and progress with the offloading agent 136. The offloading server(s) 124 receive all of the data transmitted by the offloading agent 136 and subsequently stores that data in a centralized repository archives for access by the centralized surveillance system 102.

In accordance with an example embodiment of the present invention, the centralized surveillance system 102 is configured to receive requests from users for particular sets of data (e.g., video data) from particular remote surveillance systems 116 or satellite location systems 310. The request is received by the centralized surveillance system 102 and/or the remote surveillance system 116, and the data offloading process is initiated by the systems. In one example, the data offloading process can be initiated once a vehicle has returned to a depot or transportation hub and the data that is offloaded can be limited to the data that has been requested. For example, a request can be submitted for video data from a particular vehicle (e.g., satellite location system 310) for a particular time period (e.g., offload requests made in response to criminal activity, complaints, etc.).

In accordance with an example embodiment of the present invention, the offloading agent 136 monitors and manages other devices within the satellite location system 310 during the offloading process. In one example, when determining that the ignition system for the vehicle has been turned off, the offloading agent deactivates video capturing devices 320 during offload to conserve battery charge of the vehicle. In accordance with an example embodiment of the present invention, the offloading agent 136 monitors the progress of an offload and identify when there is a problem with the offload or if the offload is interrupted. When an offload is interrupted or cannot complete, the offloading agent 136 initiates mitigating actions (e.g., reboot devise or systems, retry the offload, etc.). In accordance with an example embodiment of the present invention, the offloading agent 136 periodically automatically wakes up to fulfill and/or complete offload requests. Upon wakeup, the offloading agent 136 checks with the offloading server 124 to determine whether any requests exist, requests video, or performs software updates. Once an offload is complete, the offloading agent 136 powers down and initiates a power down for any remaining systems within the remote surveillance system 116.

Automated Video Data Request and Recovery
Based on Selected Time and Location Methodology In accordance with an example embodiment of the present invention, the system 100 includes data request software 504; in particular, video data request software. The video data request software 504 is provided by the centralized surveillance system 102 and enables access to video data from any of the satellite location systems 310 to user devices 120. As would be appreciated by one skilled in the art, the data request software 504 is implemented as a software application installed on the user devices 120, or a software application accessed by the user devices 120 through the Internet in a cloud architecture configuration. For example, the centralized surveillance system 102 provides users access to the data request software 504 through a portal on a website. The data request software 504 provides users with a mechanism to submit requests for data (e.g., video data) to the centralized surveillance system 102 based on user submitted criteria. For example, a user can login to the data request software 504 and request video data for a particular vehicle or vehicle route on a particular date or time.

In response to receiving a request for video data from a user, the centralized surveillance system 102 checks the centralized data storage system 114 if the requested video data has been offloaded and archived. If the data has been previously offloaded to the storage system 114, then the requested video data is provided to the requesting user. If not, the centralized surveillance system 102 initiates a command to the offloading server(s) 124 to request the video data from the appropriate source satellite location system 310 offloading agent 136 when they become available. As would be appreciated by one of skill in the art, the request is fulfilled based on availability, data restrictions, user access, urgency, etc.

In accordance with an example embodiment of the present invention, the user logs in to the data request software 504 and uses a map selection tool to select a defined area of a map and a particular date and/or time and request video data for all public transportation vehicles that were located someplace in the user defined geometric area of the map at the given date and/or time. For example, when an investigator is aware that a crime was committed at a particular place and a particular time, the investigator requests all available video data for the particular place at the particular time. As would be appreciated by one of skill in the art, any particular criteria can be used for requesting data from the remote surveillance systems 116. The centralized surveillance system 102 receives the selection of the geometric area defined on a geolocation map, a date selection, and a time selection, as defined by the user. As would be appreciated by one skilled in the art, any search criteria can be received and used for requesting video data. In response to the received request, the centralized surveillance system 102 submits the request to the offloading server 124 to offload the appropriate data from all of the vehicles that were in that geometric area at that time. The offloading server 124 identifies the vehicles originating the stored data originating from one or more vehicle monitoring systems recorded as being located within the selected geometric area during the selected date and the selected time. The identifying is performed by crosschecking locations of a plurality of vehicles with the selection of the geometric area and the date and time of the reported incident. For example, the offloading server 124 can submit a request to a Structured Query Language (SQL) database to obtain a list of vehicles that meet the search criteria (e.g., the vehicles in the map location data at the date and time). As would be appreciated by one of skill in the art, the crosschecking identification can be performed using any methodology known in the art. For example, the crosschecking can include using the data from heartbeat messages and status information; in particular GPS data and timestamp data, from the remote surveillance systems 116 to determine which vehicles were in a particular geometric area at a particular time period.

Once the vehicles are identified, the offloading server 124 checks the archives to determine whether the requested data has already been offloaded by the identified vehicles. For any of the requested data that is missing from the archives, the offloading server 124 submits individual offload requests (e.g., tickets) to the appropriate offloading agents 136 identified to be at the particular location during that particular time period (e.g., as provided by the searched criteria). The offloading server(s) 124 retrieve the requested data originating from the offloading agents 136 for the one or more vehicle remote surveillance systems 116 identified as being located within the selected geometric area during the selected date and the selected time, the surveillance data having been recorded only at the selected date, the selected time, and from only the one or more vehicle monitoring systems identified as being located within the selected geometric area and outputting the retrieved surveillance data. In accordance with an example embodiment of the present invention, the requesting user initially reviews the results of the identified vehicles and optionally removes individual vehicles from the results. For example, an entire list of vehicles matching the search criteria can be displayed to the user and the user can remove vehicles that they do not want to receive video data from. The vehicles removed by the user will not receive an offload request from the offloading server 124.

In accordance with an example embodiment of the present invention, the requesting user can monitor the status of their requested data on a user interface. As would be appreciated by one of skill in the art, the request status can include various forms of indication such as "in progress", "requested", "completed", or can include a percentage of completion, or another form of indication known in the art. Once the data has been identified and offloaded to the centralized surveillance system 102, the data can be provided to the user using any mechanisms known in the art. For example, a copy of the offloaded data can be provided to the user via an email or made available to the user on a web page for download.

Figure 4:
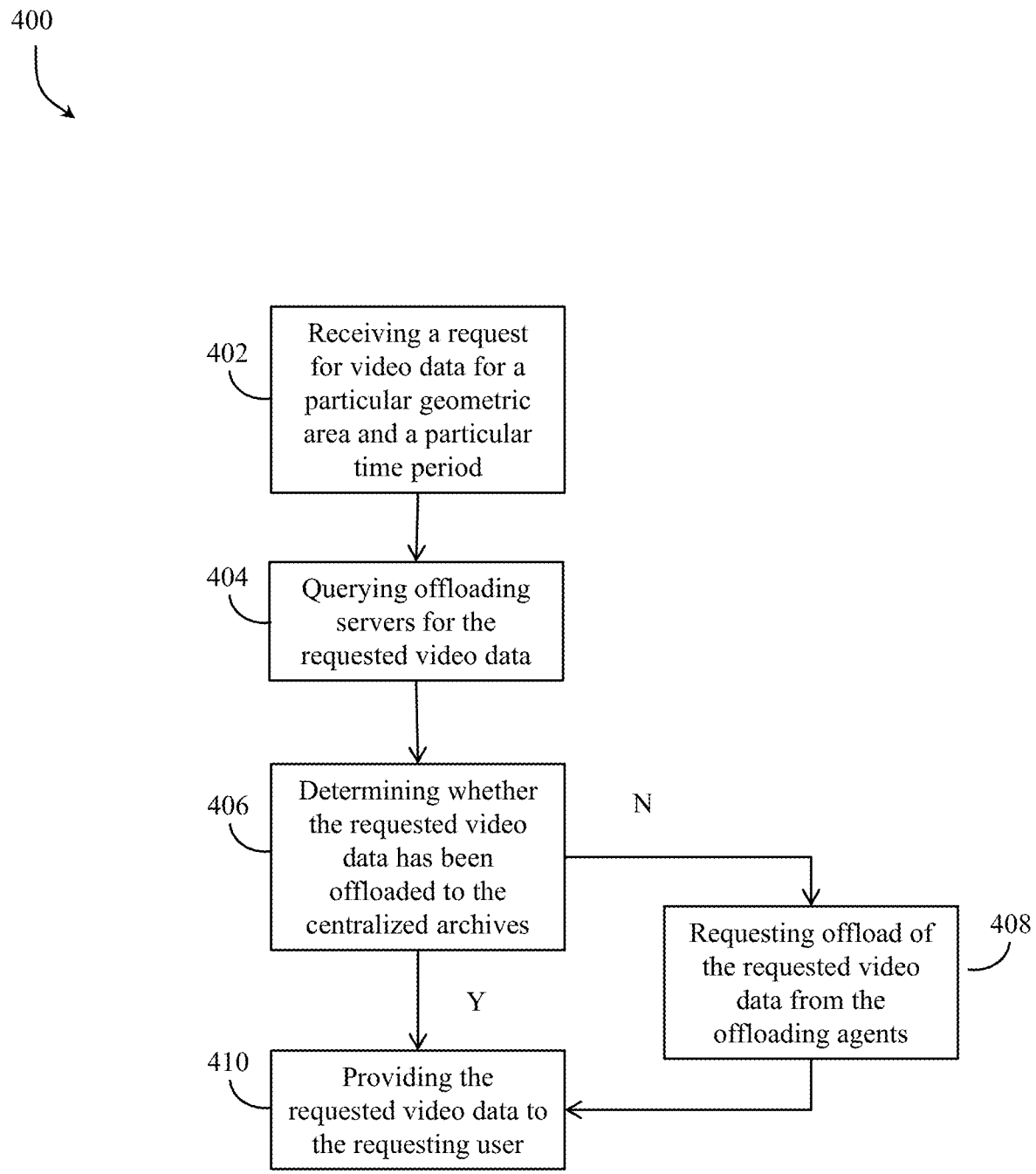
FIG. 4 is an illustrative flowchart depicting operation of the surveillance and monitoring system fulfilling a request for data.

FIG. 4 depicts a method for fulfilling a request for data from the remote surveillance systems 116, in accordance with the present invention. In particular, process 400 depicts a method for fulfilling a request for video data from a user defined geometric area at a particular time. At step 402, the centralized surveillance system 102 receives a request from a user for a video data captured in a predetermined geometric area selected on a map during a predetermined period of time. At step 404, the centralized surveillance system 102 queries the offloading server(s) 124 to identifies which video data from which remote surveillance systems 116 corresponds to the requested geometric area at the predetermined time period. The querying process includes crosschecking the location and timestamp information associated with all of the vehicles within the transportation system with the requested geometric area and time period. At step 406, the offloading server(s) 124 determined whether the identified video data has been previously offloaded to the centralized archives. If the requested video data has been previously offloaded then the process advances to step 410, otherwise the process advances to step 408. At step 408, the offloading server(s) 124 initiates a request to the offloading agents 136 from the identified remote surveillance systems 116 to offload the requested video data. Once the video data is offloaded by the offloading agents 136 the video data is recorded in the archives and advances to step 410. At step 410, the requested video data can be provided to the requesting user from the archives.

Figure 5:
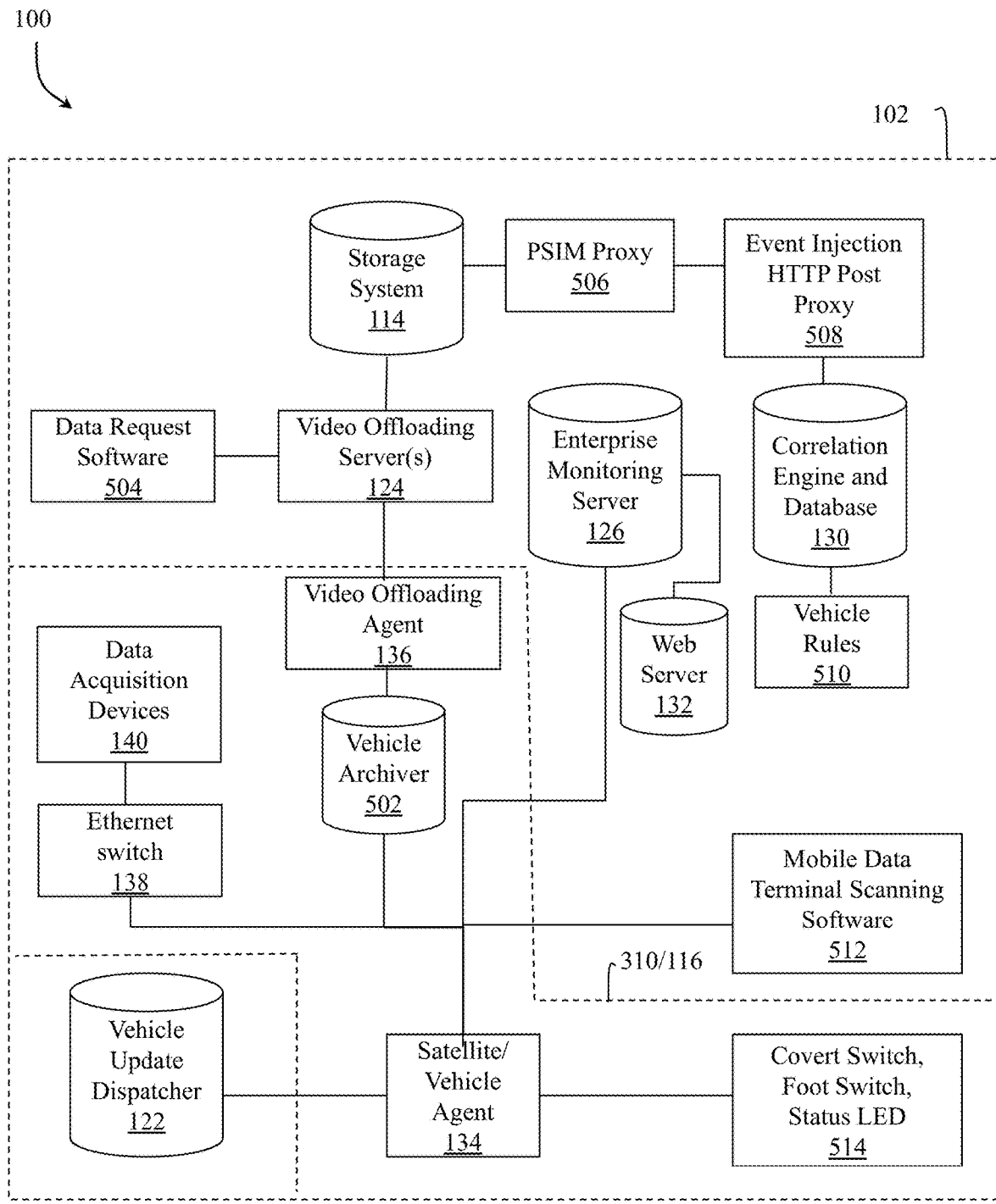
FIG. 5 is an illustrative environment for implementing the surveillance and monitoring system.

FIG. 5 depicts an exemplary implementation of all of the inventive systems combined within the overall system 100, as discussed herein. In particular, FIG. 5 depicts an exemplary system 100 for use with vehicles in a transportation network. The system 100 in FIG. 5 includes the centralized surveillance system 102 and plurality of satellite location systems 310 including the remote surveillance systems 116 and how each of the elements relate to one another. Each of the devices included within the system 102 include all the functionality as discussed with respect to FIGS. 1-4, as well as the functionality discussed with respect to FIG. 5.

In accordance with an example embodiment of the present invention, the satellite location systems 310 including the remote surveillance systems 116 include the satellite vehicle agent 134 communicatively attached to the local vehicle archiver 502, the video offloading agent 136, the Ethernet switch 138, the data acquisition devices 140 via the Ethernet switch 138, and the combined covert switch, foot switch, and status LED device 514. The satellite agent 134 is also communicatively attached to other devices within the centralized surveillance system 102 located remotely from the satellite location systems 310. In accordance with an example embodiment of the present invention, the satellite agent 134 is communicatively attached to the video offloading agent 136 via the local vehicle archiver, the mobile data terminal scanning software 512, and the enterprise monitoring server 126. As would be appreciated by one skilled in the art, the satellite agent 134 can be communicatively attached to any combination of devices, software, and systems within the centralized surveillance system 102 either directly or indirectly.

In accordance with an example embodiment of the present invention, the centralized surveillance system 102 includes the video offloading server(s) 124, the data request software 504, the storage system 114, the PSIM Proxy 506, the event injection HTTP post proxy 508, the correlation engine and database 130, the vehicle rules 510, the enterprise monitoring server 126, the web server 132, the vehicle update dispatcher 122, and the mobile data terminal scanning software 512.

Continuing with FIG. 5, the satellite agent 134 is configured to monitor the covert and foot switches and control the status LED 514, trigger alarms via SDK, monitor health of the data acquisition devices 140, manage shutdown sequences, control onboard video display, monitory connectivity to the network for the system 102, and implement self-healing features. The local vehicle archiver 502 is configured to record and serve video data and log alarms and bookmarks related to the video data. The video offloading agent 136 is configured to monitor for connection to the offloading serve and offload alarm tagged video and events.

The vehicle update dispatcher 122 is configured to automatically distribute software and firmware patches, track software and firmware version levels for each vehicle, and update vehicles as they are available online. The mobile data terminal scanning software 512 is configured to scan for vehicles in radio range, connect to vehicles and launch the client for connection to user devices (e.g., police vehicles in range), and automatically download new vehicle IDs and passwords. The data request software 504 is configured to make requests for video to be downloaded from the vehicles, and geo-search for video data based on location and time frame. The video offloading server(s) 124 are configured to monitor for connection to video offloading agent 136, accept offloaded video and events from the video offloading agent 136, and import video and events into the archives of the storage system 114. The PSIM proxy 506 is configured to monitor new alarm events and create PSIM events. The event injection HTTP post proxy 508 is configured to accept new PSIM events via HTML posts and send received events to the PSIM correlation engine 130. The PSIM correlation engine and database 130 are configured to pump events and process alarm/alert rules according to the vehicle rules 510. The vehicle rules 510 are configured with watches for vehicle related event messages and create PSIM situations.

The web server 132 is configured to provide real time health alert monitoring, provide a GUI with live dynamic vehicle and fleet maps, provide live and recorded video streaming, receive user instruction for device rebooting, provide an executive dashboard, and vehicle service tracking and history. The enterprise monitoring server 126 is configured to supervise online presence of all vehicles, receive and report health related messages from vehicles to the web server 132, provide automatic and user requested reboot of devices on the vehicles, provide geographical location tracking services, and monitor the CAD./AVL devices on the vehicles.

Figure 6:
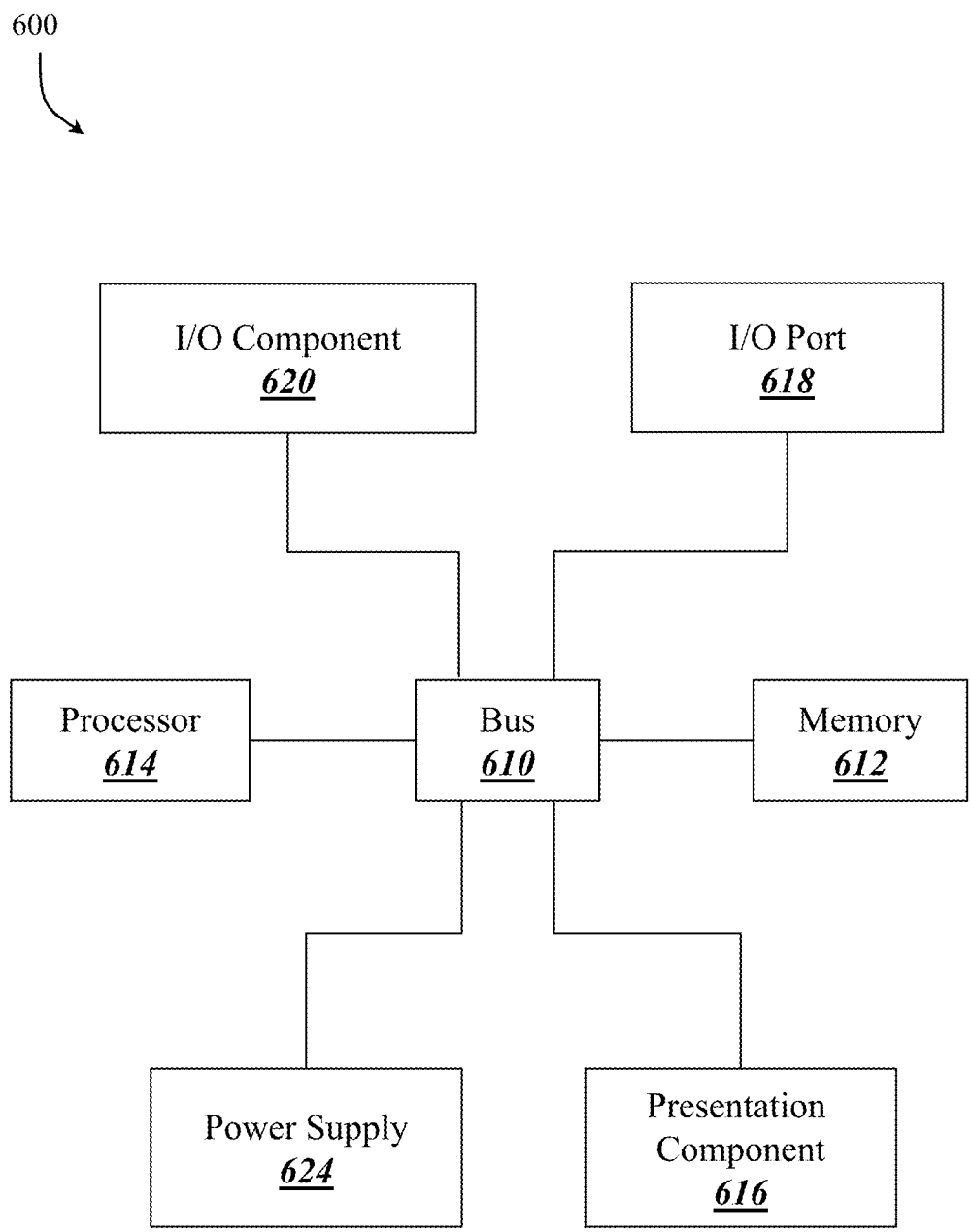
FIG. 6 is a diagrammatic illustration of a high level architecture for implementing processes of the surveillance and monitoring system.

Any suitable computing device can be used to implement the computing devices 102, 104, 120, and 116 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 600 is depicted in FIG. 6. The computing device 600 is merely an illustrative example of a suitable computing environment and in no way limits the scope of the present invention. A "computing device," as represented by FIG. 6, can include a "workstation," a "server," a "laptop," a "desktop," a "hand-held device," a "mobile device," a "tablet computer," or other computing devices, as would be understood by those of skill in the art. Given that the computing device 600 is depicted for illustrative purposes, embodiments of the present invention may utilize any number of computing devices 600 in any number of different ways to implement a single embodiment of the present invention. Accordingly, embodiments of the present invention are not limited to a single computing device 600, as would be appreciated by one with skill in the art, nor are they limited to a single type of implementation or configuration of the example computing device 600.

The computing device 600 can include a bus 610 that can be coupled to one or more of the following illustrative components, directly or indirectly: a memory 612, one or more processors 614, one or more presentation components 616, input/output ports 618, input/output components 620, and a power supply 624. One of skill in the art will appreciate that the bus 610 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 6 is merely illustrative of an exemplary computing device that can be used to implement one or more embodiments of the present invention, and in no way limits the invention.

The computing device 600 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices that can be used to encode information and can be accessed by the computing device 600.

The memory 612 can include computer-storage media in the form of volatile and/or nonvolatile memory. The memory 612 may be removable, non-removable, or any combination thereof. Exemplary hardware devices are devices such as hard drives, solid-state memory, optical-disc drives, and the like. The computing device 600 can include one or more processors that read data from components such as the memory 612, the various I/O components 616, etc. Presentation component(s) 616 present data indications to a user or other device. Exemplary presentation components include a display device, speaker, printing component, vibrating component, etc.

The I/O ports 618 can enable the computing device 600 to be logically coupled to other devices, such as I/O components 620. Some of the I/O components 620 can be built into the computing device 600. Examples of such I/O components 620 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A surveillance video data acquisition system, comprising:
    a computing device configured to:
        receive a selection of a geometric area defined on a geolocation map, a date selection, and a time selection;
        identify one or more vehicle monitoring systems comprising a video capture device recorded as being located within the selection of the geometric area defined on geolocation map during the selected date and the selected time, the one or more vehicle monitoring systems comprising a video capture device and an offloading agent being dispatched in one or more vehicles;
        automatically retrieve surveillance video data originating from the one or more vehicle monitoring systems comprising a video capture device and an offloading agent identified as being located within the selection of the geometric area defined on a geolocation map during the selected date and the selected time, the surveillance video data having been recorded at the selected date and the selected time, wherein the surveillance video data is offloaded from the identified one or more vehicle monitoring systems by the offloading agent of the one or more vehicle monitoring systems; and
        output the retrieved surveillance video data recorded on the one or more vehicles within the selected geometric area defined on the geolocation map at the selected date and selected time.

2. The system of claim 1, wherein identifying one or more vehicle monitoring systems comprising a video capture device recorded as being located within the selection of the geometric area defined on a geolocation map during the selected date and the selected time comprises:

displaying a list of one or more vehicle monitoring systems comprising a video capture device located within the selection of the geographic area defined on a geolocation map during the selected date and the selected time; and receiving a selection of the listed one or more vehicle monitoring systems for automatic retrieval of surveillance video data.

3. The system of claim 1, wherein the date selection comprises a range of dates.

4. The system of claim 1, wherein the time selection comprises a range of time.

5. The system of claim 1, wherein automatically retrieving surveillance video data originating from the one or more vehicle monitoring systems further comprises:

providing a status indicator for indicating an upload of recorded video for each of the identified one or more vehicles.

6. The system of claim 1, wherein the selection of a geometric area defined on a geolocation map, a date selection, and a time selection is received via a software application running on a user device.

7. The system of claim 1, wherein outputting the retrieved surveillance video data comprises:

providing an email or notification to a user regarding the retrieved surveillance video data.

8. The system of claim 1, wherein outputting the retrieved surveillance video data comprises:

providing a graphical user interface where a user can view the retrieved surveillance video data.

9. The system of claim 1, wherein the one or more vehicles comprise fleet vehicles.

10. The system of claim 9, wherein the fleet vehicles comprise buses.

11. A surveillance system, comprising:

a user module, powered by a processer, and comprising a geometric area selector on a geolocation map, a date selector, and a time selector;

a user interface module, powered by a processor, that receives from the user module a selection of a geometric area defined on a geolocation map, a date selection, and a time selection;

wherein the user interface module identifies one or more vehicle monitoring systems comprising a video capture device and an offloading agent dispatched in one or more vehicles of a plurality of vehicles located within the selected geometric area defined on a geolocation map at the date selection and the time selection received from the user;

an offloading module, powered by a processor, that automatically initiates requests to the offloading agents for the identified one or more vehicle monitoring systems to upload all surveillance video data for a predetermined time defined by the geometric area, date, and time selections received from the user;

wherein the offloading module receives the surveillance video data uploaded from the offloading agents of the identified one or more vehicle monitoring systems, the surveillance video data having been recorded on the one or more vehicles located within the selected geometric area defined on the geolocation map at the selected date and the selected time; and wherein the offloading module communicates the surveillance video data to the computing device, which outputs the surveillance video data recorded on the one or more vehicles within the selected geometric area defined on the geolocation map at the selected date and selected time.

12. The system of claim 11, wherein identifying one or more vehicle monitoring systems comprising a video capture device recorded as being located within the selection of the geometric area defined on a geolocation map during the selected date and the selected time comprises:

displaying a list of one or more vehicle monitoring systems comprising a video capture device located within the selection of the geographic area defined on a geolocation map during the selected date and the selected time; and receiving a selection of the listed one or more vehicle monitoring systems for automatic retrieval of surveillance video data.

13. The system of claim 11, wherein the date selection comprises a range of dates.

14. The system of claim 11, wherein the time selection comprises a range of time.

15. The system of claim 11, further comprising a status indicator for indicating an upload of recorded video for each of the identified one or more vehicles.

16. The system of claim 11, wherein the user module comprises a software application running on a user device.

17. The system of claim 11, wherein outputting the retrieved surveillance video data comprises:

providing an email or notification to a user regarding the retrieved surveillance video data.

18. The system of claim 11, wherein outputting the retrieved surveillance video data comprises:

providing a graphical user interface where a user can view the retrieved surveillance video data.

19. The system of claim 11, wherein the one or more vehicles comprise fleet vehicles.

20. The system of claim 19, wherein the fleet vehicles comprise buses.

21. A method for acquiring surveillance video data from fleet vehicles, the method comprising:

receiving, from a user via a software application running on a user device, a selection of a geometric area defined on a geolocation map, a date selection, and a time selection;

identifying, using a processor running on a computing device, one or more vehicle monitoring systems comprising a video capture device and an offloading agent recorded as being located within the selection of the geometric area defined on a geolocation map during the selected date and the selected time, the one or more vehicle monitoring systems comprising the video capture device being dispatched in one or more vehicles; and retrieving surveillance video data originating from the one or more vehicle monitoring systems comprising a video capture device and an offloading agent identified as being located within the selection of the geometric area defined on a geolocation map during the selected date and the selected time, the surveillance video data having been recorded at the selected date and the selected time, wherein the surveillance video data is offloaded from the identified one or more vehicle monitoring systems by the offloading agent of the one or more vehicle monitoring systems.

* * * * *